(12) United States Patent
Knee et al.

(10) Patent No.: US 9,635,406 B2
(45) Date of Patent: *Apr. 25, 2017

(54) INTERACTIVE TELEVISION PROGRAM GUIDE SYSTEM FOR DETERMINING USER VALUES FOR DEMOGRAPHIC CATEGORIES

(71) Applicant: Rovi Guides, Inc., Santa Clara, CA (US)

(72) Inventors: Robert A. Knee, Lansdale, PA (US); Steven J. Reynolds, Littleton, CO (US); Michael D. Ellis, Boulder, CO (US); Joel G. Hassell, Golden, CO (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,852

(22) Filed: Mar. 10, 2015

(65) Prior Publication Data

US 2015/0222943 A1 Aug. 6, 2015

Related U.S. Application Data

(63) Continuation of application No. 12/905,467, filed on Oct. 15, 2010, now Pat. No. 9,015,750, which is a
(Continued)

(51) Int. Cl.
*H04N 7/10* (2006.01)
*H04N 7/025* (2006.01)
(Continued)

(52) U.S. Cl.
CPC ....... *H04N 21/25883* (2013.01); *H04N 7/163* (2013.01); *H04N 7/17318* (2013.01);
(Continued)

(58) Field of Classification Search
USPC .............................................. 725/32, 34–35
See application file for complete search history.

(56) References Cited

U.S. PATENT DOCUMENTS

| | | |
|---|---|---|
| 3,440,427 A | 4/1969 | Kammer |
| 3,492,577 A | 1/1970 | Reiter et al. |

(Continued)

FOREIGN PATENT DOCUMENTS

| | | |
|---|---|---|
| AU | 5619898 A | 7/1998 |
| AU | 731010 B2 | 3/2001 |

(Continued)

OTHER PUBLICATIONS

US 5,047,897, 09/1991, Strubbe et al. (withdrawn)
(Continued)

*Primary Examiner* — Mulugeta Mengesha
(74) *Attorney, Agent, or Firm* — Ropes & Gray LLP

(57) ABSTRACT

An interactive television program guide system for determining user input values for demographic categories is provided. The system includes user television equipment having a receiver for receiving program guide information for the interactive television program guide, a user input receiver for receiving user input from user interface, such as a remote control, a microprocessor which utilizes the user input received to determine user values for demographic categories, and memory for storing the user values determined. In one illustrative use of the system for targeting advertisements to a user of the interactive television program guide, the receiver also receives advertisements, where the advertisements have preselected values for specified demographic categories. The user television equipment, preferably using microprocessor, compares the preselected values for the specified demographic categories associated with the advertisements with values of corresponding demographic categories stored in memory to determine which
(Continued)

| USER INPUT | WEIGHT VALUE |
|---|---|
| ① RECORD PROGRAM | 1.0 |
| ② SET REMINDER | 0.5 |
| ③ TUNE/WATCH MINIMUM 5 MINUTES | 0.5 |
| ④ RETRIEVE INFORMATION | 0.25 | advertisements should be displayed. Those advertisements determined to be displayable based upon the comparison are then displayed.

16 Claims, 5 Drawing Sheets

Related U.S. Application Data continuation of application No. 12/579,639, filed on Oct. 15, 2009, now abandoned, which is a continuation of application No. 10/923,263, filed on Aug. 20, 2004, now Pat. No. 7,634,786, which is a continuation of application No. 09/139,777, filed on Aug. 25, 1998, now abandoned.

(60) Provisional application No. 60/085,750, filed on May 15, 1998.

(51) Int. Cl.
| | |
|---|---|
| H04N 21/258 | (2011.01) |
| H04N 7/16 | (2011.01) |
| H04N 21/442 | (2011.01) |
| H04N 21/45 | (2011.01) |
| H04N 21/454 | (2011.01) |
| H04N 21/466 | (2011.01) |
| H04N 21/81 | (2011.01) |
| H04N 7/173 | (2011.01) |
| H04N 21/235 | (2011.01) |

(52) U.S. Cl.
CPC ..... *H04N 21/235* (2013.01); *H04N 21/44222* (2013.01); *H04N 21/454* (2013.01); *H04N 21/4532* (2013.01); *H04N 21/4662* (2013.01); *H04N 21/812* (2013.01); *H04N 21/8106* (2013.01)

(56) References Cited

U.S. PATENT DOCUMENTS

| | | |
|---|---|---|
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,070,693 A | 1/1978 | Shutterly |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,189,781 A | 2/1980 | Douglas |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,482 A | 6/1982 | Coutta |
| 4,337,483 A | 6/1982 | Guillou |
| 4,344,090 A | 8/1982 | Belisomi et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,403,285 A | 9/1983 | Kikuchi |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kru/ ger et al. |
| 4,495,654 A | 1/1985 | Deiss |
| 4,496,171 A | 1/1985 | Cherry |
| 4,496,804 A | 1/1985 | Hung |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,755 A | 11/1985 | Kurosawa et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,608,859 A | 9/1986 | Rockley |
| 4,611,269 A | 9/1986 | Suzuki et al. |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffman et al. |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |

(56) References Cited

U.S. PATENT DOCUMENTS

| | | |
|---|---|---|
| 4,714,919 A | 12/1987 | Foster |
| 4,718,107 A | 1/1988 | Hayes |
| RE32,632 E | 3/1988 | Atkinson |
| 4,729,027 A | 3/1988 | Hakamada et al. |
| 4,729,028 A | 3/1988 | Micic et al. |
| 4,734,769 A | 3/1988 | Davis |
| 4,745,549 A | 5/1988 | Hashimoto |
| 4,746,983 A | 5/1988 | Hakamada |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,847,744 A | 7/1989 | Araki |
| 4,855,813 A | 8/1989 | Russell et al. |
| 4,857,999 A | 8/1989 | Welsh |
| 4,862,268 A | 8/1989 | Campbell et al. |
| 4,864,429 A | 9/1989 | Eigeldinger et al. |
| 4,873,584 A | 10/1989 | Hashimoto |
| 4,873,623 A | 10/1989 | Lane et al. |
| 4,876,600 A | 10/1989 | Pietzsch et al. |
| 4,882,732 A | 11/1989 | Kaminaga |
| 4,884,223 A | 11/1989 | Ingle et al. |
| 4,888,796 A | 12/1989 | Olivo, Jr. |
| 4,890,168 A | 12/1989 | Inoue et al. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,899,139 A | 2/1990 | Ishimochi et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,918,531 A | 4/1990 | Johnson |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,942,391 A | 7/1990 | Kikuta |
| 4,954,882 A | 9/1990 | Kamemoto |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,782 A | 2/1991 | Sakamoto et al. |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,003,384 A | 3/1991 | Durden et al. |
| 5,005,084 A | 4/1991 | Skinner |
| 5,008,853 A | 4/1991 | Bly et al. |
| 5,014,125 A | 5/1991 | Pocock et al. |
| 5,023,721 A | 6/1991 | Moon-Hwan |
| 5,027,400 A | 6/1991 | Baji et al. |
| 5,031,045 A | 7/1991 | Kawasaki |
| 5,036,314 A | 7/1991 | Barillari et al. |
| 5,038,211 A | 8/1991 | Hallenbeck |
| 5,040,067 A | 8/1991 | Yamazaki |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,075,771 A | 12/1991 | Hashimoto |
| 5,083,205 A | 1/1992 | Arai |
| 5,083,800 A | 1/1992 | Lockton |
| 5,091,785 A | 2/1992 | Canfield et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,109,279 A | 4/1992 | Ando |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura et al. |
| 5,128,766 A | 7/1992 | Choi |
| 5,146,335 A | 9/1992 | Kim et al. |
| 5,148,154 A | 9/1992 | MacKay et al. |
| 5,148,275 A | 9/1992 | Blatter et al. |
| 5,151,782 A | 9/1992 | Ferraro |
| 5,151,789 A | 9/1992 | Young |
| 5,155,591 A | 10/1992 | Wachob |
| 5,155,806 A | 10/1992 | Hoeber et al. |
| 5,157,768 A | 10/1992 | Hoeber et al. |
| 5,161,019 A | 11/1992 | Emanuel |
| 5,161,023 A | 11/1992 | Keenan |
| 5,162,905 A | 11/1992 | Itoh et al. |
| 5,170,388 A | 12/1992 | Endoh |
| 5,172,111 A | 12/1992 | Olivo, Jr. |
| 5,172,413 A | 12/1992 | Bradley et al. |
| 5,177,604 A | 1/1993 | Martinez |
| 5,179,654 A | 1/1993 | Richards et al. |
| 5,182,646 A | 1/1993 | Keenan |
| 5,194,941 A | 3/1993 | Grimaldi et al. |
| 5,195,092 A | 3/1993 | Wilson et al. |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,260,999 A | 11/1993 | Wyman |
| 5,283,561 A | 2/1994 | Lumelsky et al. |
| 5,283,639 A | 2/1994 | Esch et al. |
| 5,283,819 A | 2/1994 | Glick et al. |
| 5,285,265 A | 2/1994 | Choi et al. |
| 5,285,278 A | 2/1994 | Holman |
| 5,299,006 A | 3/1994 | Kim et al. |

(56) References Cited

U.S. PATENT DOCUMENTS

| | | |
|---|---|---|
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,315,392 A | 5/1994 | Ishikawa et al. |
| 5,317,403 A | 5/1994 | Keenan |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,343,239 A | 8/1994 | Lappington et al. |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,355,162 A | 10/1994 | Yazolino et al. |
| 5,357,276 A | 10/1994 | Banker et al. |
| 5,359,367 A | 10/1994 | Stockill |
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,373,288 A | 12/1994 | Blahut |
| 5,374,942 A | 12/1994 | Gilligan et al. |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,389,964 A | 2/1995 | Oberle et al. |
| 5,390,027 A | 2/1995 | Henmi et al. |
| 5,398,074 A | 3/1995 | Duffield et al. |
| 5,404,393 A | 4/1995 | Remillard |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,416,508 A | 5/1995 | Sakuma et al. |
| 5,424,770 A | 6/1995 | Schmelzer et al. |
| 5,425,101 A | 6/1995 | Woo et al. |
| 5,428,406 A | 6/1995 | Terasawa |
| 5,432,561 A | 7/1995 | Strubbe |
| 5,434,625 A | 7/1995 | Willis |
| 5,434,626 A | 7/1995 | Hayashi et al. |
| 5,434,678 A | 7/1995 | Abecassis |
| 5,436,676 A | 7/1995 | Pint et al. |
| 5,438,372 A | 8/1995 | Tsumori et al. |
| 5,440,678 A | 8/1995 | Eisen et al. |
| 5,444,499 A | 8/1995 | Saitoh |
| 5,446,919 A | 8/1995 | Wilkins |
| 5,452,012 A | 9/1995 | Saitoh |
| 5,453,146 A | 9/1995 | Kemper |
| 5,453,796 A | 9/1995 | Duffield et al. |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,469,206 A | 11/1995 | Strubbe et al. |
| 5,473,442 A | 12/1995 | Kim et al. |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,485,518 A | 1/1996 | Hunter et al. |
| 5,488,409 A | 1/1996 | Yuen et al. |
| 5,495,295 A | 2/1996 | Long |
| 5,502,504 A | 3/1996 | Marshall et al. |
| 5,515,098 A | 5/1996 | Carles |
| 5,523,791 A | 6/1996 | Berman |
| 5,523,794 A | 6/1996 | Mankovitz et al. |
| 5,523,795 A | 6/1996 | Ueda |
| 5,523,796 A | 6/1996 | Marshall et al. |
| 5,524,195 A | 6/1996 | Clanton, III et al. |
| 5,525,795 A | 6/1996 | MacGregor et al. |
| 5,526,034 A | 6/1996 | Hoarty et al. |
| 5,527,257 A | 6/1996 | Piramoon |
| 5,528,304 A | 6/1996 | Cherrick et al. |
| 5,532,735 A | 7/1996 | Blahut et al. |
| 5,532,754 A | 7/1996 | Young et al. |
| 5,534,911 A | 7/1996 | Levitan |
| 5,537,141 A | 7/1996 | Harper et al. |
| 5,539,479 A | 7/1996 | Bertram |
| 5,539,822 A | 7/1996 | Lett |
| 5,541,662 A | 7/1996 | Adams et al. |
| 5,541,738 A | 7/1996 | Mankovitz |
| 5,546,521 A | 8/1996 | Martinez |
| 5,550,576 A | 8/1996 | Klosterman |
| 5,557,338 A | 9/1996 | Maze et al. |
| 5,557,721 A | 9/1996 | Fite et al. |
| 5,557,724 A | 9/1996 | Sampat et al. |
| 5,559,548 A | 9/1996 | Davis et al. |
| 5,559,549 A | 9/1996 | Hendricks et al. |
| 5,559,550 A | 9/1996 | Mankovitz |
| 5,559,942 A | 9/1996 | Gough et al. |
| 5,561,471 A | 10/1996 | Kim |
| 5,570,295 A | 10/1996 | Isenberg et al. |
| 5,572,442 A | 11/1996 | Schulhof et al. |
| 5,574,962 A | 11/1996 | Fardeau et al. |
| 5,579,055 A | 11/1996 | Hamilton et al. |
| 5,581,479 A | 12/1996 | McLaughlin et al. |
| 5,582,364 A | 12/1996 | Trulin et al. |
| 5,583,560 A | 12/1996 | Florin et al. |
| 5,583,563 A | 12/1996 | Wanderscheid et al. |
| 5,584,025 A | 12/1996 | Keithley et al. |
| 5,584,525 A | 12/1996 | Nakano et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,492 A | 1/1997 | O'Callaghan et al. |
| 5,594,509 A | 1/1997 | Florin et al. |
| 5,596,373 A | 1/1997 | White et al. |
| 5,600,364 A | 2/1997 | Hendricks et al. |
| 5,600,365 A | 2/1997 | Kondo et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,602,598 A | 2/1997 | Shintani |
| 5,602,600 A | 2/1997 | Queinnec |
| 5,606,374 A | 2/1997 | Bertram |
| 5,608,448 A | 3/1997 | Smoral et al. |
| 5,610,653 A | 3/1997 | Abecassis |
| 5,610,664 A | 3/1997 | Bobert |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,625,406 A | 4/1997 | Newberry et al. |
| 5,627,940 A | 5/1997 | Rohra et al. |
| 5,629,733 A | 5/1997 | Youman et al. |
| 5,630,119 A | 5/1997 | Aristides et al. |
| 5,631,995 A | 5/1997 | Weissensteiner et al. |
| 5,633,683 A | 5/1997 | Rosengren et al. |
| 5,635,978 A | 6/1997 | Alten et al. |
| 5,635,979 A | 6/1997 | Kostreski et al. |
| 5,635,989 A | 6/1997 | Rothmuller |
| 5,636,346 A | 6/1997 | Saxe |
| 5,640,501 A | 6/1997 | Turpin |
| 5,640,577 A | 6/1997 | Scharmer |

(56) References Cited

U.S. PATENT DOCUMENTS

| | | |
|---|---|---|
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,659,350 A | 8/1997 | Hendricks et al. |
| 5,659,366 A | 8/1997 | Kerman |
| 5,661,516 A | 8/1997 | Carles |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz et al. |
| 5,666,498 A | 9/1997 | Amro |
| 5,666,645 A | 9/1997 | Thomas et al. |
| 5,671,276 A | 9/1997 | Eyer et al. |
| 5,671,411 A | 9/1997 | Watts et al. |
| 5,675,390 A | 10/1997 | Schindler et al. |
| 5,675,752 A | 10/1997 | Scott et al. |
| 5,677,708 A | 10/1997 | Matthews, III et al. |
| 5,682,195 A | 10/1997 | Hendricks et al. |
| 5,682,206 A | 10/1997 | Wehmeyer et al. |
| 5,684,525 A | 11/1997 | Klosterman |
| 5,686,954 A | 11/1997 | Yoshinobu et al. |
| 5,687,331 A | 11/1997 | Volk et al. |
| 5,689,648 A | 11/1997 | Diaz et al. |
| 5,689,666 A | 11/1997 | Berquist et al. |
| 5,692,214 A | 11/1997 | Levine |
| 5,694,163 A | 12/1997 | Harrison |
| 5,694,176 A | 12/1997 | Bruette et al. |
| 5,694,381 A | 12/1997 | Sako |
| 5,696,905 A | 12/1997 | Reimer et al. |
| 5,699,107 A | 12/1997 | Lawler et al. |
| 5,699,125 A | 12/1997 | Rzeszewski et al. |
| 5,708,478 A | 1/1998 | Tognazzini |
| 5,710,601 A | 1/1998 | Marshall et al. |
| 5,710,815 A | 1/1998 | Ming et al. |
| 5,710,884 A | 1/1998 | Dedrick |
| 5,715,314 A | 2/1998 | Payne et al. |
| 5,715,399 A | 2/1998 | Bezos |
| 5,717,452 A | 2/1998 | Janin et al. |
| 5,721,829 A | 2/1998 | Dunn et al. |
| 5,724,521 A | 3/1998 | Dedrick |
| 5,724,525 A | 3/1998 | Beyers, II et al. |
| 5,727,060 A | 3/1998 | Young |
| 5,727,163 A | 3/1998 | Bezos |
| 5,731,844 A | 3/1998 | Rauch et al. |
| 5,734,444 A | 3/1998 | Yoshinobu |
| 5,734,720 A | 3/1998 | Salganicoff |
| 5,734,853 A | 3/1998 | Hendricks et al. |
| 5,734,893 A | 3/1998 | Li et al. |
| 5,737,028 A | 4/1998 | Bertram et al. |
| 5,737,030 A | 4/1998 | Hong et al. |
| 5,740,231 A | 4/1998 | Cohn et al. |
| 5,740,549 A | 4/1998 | Reilly et al. |
| 5,745,710 A | 4/1998 | Clanton, III et al. |
| 5,749,043 A | 5/1998 | Worthy |
| 5,751,282 A | 5/1998 | Girard et al. |
| 5,752,159 A | 5/1998 | Faust et al. |
| 5,752,160 A | 5/1998 | Dunn |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A * | 5/1998 | Herz et al. ............ 725/116 |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,768,528 A | 6/1998 | Stumm |
| 5,774,170 A | 6/1998 | Hite et al. |
| 5,774,357 A | 6/1998 | Hoffberg et al. |
| 5,774,534 A | 6/1998 | Mayer |
| 5,774,887 A | 6/1998 | Wolff et al. |
| 5,778,182 A | 7/1998 | Cathey et al. |
| 5,781,226 A | 7/1998 | Sheehan |
| 5,781,245 A | 7/1998 | Van Der Weij et al. |
| 5,781,246 A | 7/1998 | Alten et al. |
| 5,784,258 A | 7/1998 | Quinn |
| 5,790,202 A | 8/1998 | Kummer et al. |
| 5,790,426 A | 8/1998 | Robinson |
| 5,790,835 A | 8/1998 | Case et al. |
| 5,790,935 A | 8/1998 | Payton |
| 5,793,364 A | 8/1998 | Bolanos et al. |
| 5,793,409 A | 8/1998 | Tetsumura |
| 5,793,438 A | 8/1998 | Bedard |
| 5,793,964 A | 8/1998 | Rogers et al. |
| 5,797,011 A | 8/1998 | Kroll et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,154 A | 9/1998 | Brown |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,808,608 A | 9/1998 | Young et al. |
| 5,808,694 A | 9/1998 | Usui et al. |
| 5,809,204 A | 9/1998 | Young et al. |
| 5,812,205 A | 9/1998 | Milnes et al. |
| 5,815,145 A | 9/1998 | Matthews, III |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,541 A | 10/1998 | Matsuura et al. |
| 5,819,019 A | 10/1998 | Nelson |
| 5,819,156 A | 10/1998 | Belmont |
| 5,819,284 A | 10/1998 | Farber et al. |
| 5,822,123 A | 10/1998 | Davis et al. |
| 5,828,402 A | 10/1998 | Collings |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |
| 5,838,314 A | 11/1998 | Neel et al. |
| 5,842,010 A | 11/1998 | Jain et al. |
| 5,842,199 A | 11/1998 | Miller et al. |
| 5,844,620 A | 12/1998 | Coleman et al. |
| 5,848,352 A | 12/1998 | Dougherty et al. |
| 5,848,396 A | 12/1998 | Gerace |
| 5,848,397 A | 12/1998 | Marsh et al. |
| 5,850,218 A | 12/1998 | LaJoie et al. |
| 5,862,292 A | 1/1999 | Kubota et al. |
| 5,864,823 A | 1/1999 | Levitan |
| 5,867,226 A | 2/1999 | Wehmeyer et al. |
| 5,867,227 A | 2/1999 | Yamaguchi |
| 5,870,543 A | 2/1999 | Ronning |
| 5,872,588 A | 2/1999 | Aras et al. |
| 5,874,985 A | 2/1999 | Matthews, III |
| 5,875,108 A | 2/1999 | Hoffberg et al. |
| 5,880,768 A | 3/1999 | Lemmons et al. |
| 5,883,677 A | 3/1999 | Hofmann |
| 5,886,691 A | 3/1999 | Furuya et al. |
| 5,886,731 A | 3/1999 | Ebisawa |
| 5,889,950 A | 3/1999 | Kuzma |
| 5,892,498 A | 4/1999 | Marshall et al. |
| 5,892,535 A | 4/1999 | Allen et al. |
| 5,895,474 A | 4/1999 | Maarek et al. |
| 5,900,905 A | 5/1999 | Shoff et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,497 A | 5/1999 | Vaughan et al. |
| 5,907,323 A | 5/1999 | Lawler et al. |
| 5,907,366 A | 5/1999 | Farmer et al. |

(56) References Cited

U.S. PATENT DOCUMENTS

| | | |
|---|---|---|
| 5,914,746 A | 6/1999 | Matthews, III et al. |
| 5,917,481 A | 6/1999 | Rzeszewski et al. |
| 5,917,830 A | 6/1999 | Chen et al. |
| 5,918,014 A | 6/1999 | Robinson |
| 5,920,700 A | 7/1999 | Gordon et al. |
| 5,929,849 A | 7/1999 | Kikinis |
| 5,929,850 A | 7/1999 | Broadwin et al. |
| 5,936,614 A | 8/1999 | An et al. |
| 5,936,679 A | 8/1999 | Kasahara et al. |
| 5,940,073 A | 8/1999 | Klosterman et al. |
| 5,940,572 A | 8/1999 | Balaban et al. |
| 5,940,614 A | 8/1999 | Allen et al. |
| 5,945,988 A | 8/1999 | Williams et al. |
| 5,951,642 A | 9/1999 | Onoe et al. |
| 5,953,005 A | 9/1999 | Liu |
| 5,959,688 A | 9/1999 | Schein et al. |
| 5,960,411 A | 9/1999 | Hartman et al. |
| 5,973,683 A | 10/1999 | Cragun et al. |
| 5,974,222 A | 10/1999 | Yuen et al. |
| 5,977,964 A | 11/1999 | Williams et al. |
| 5,986,650 A | 11/1999 | Ellis et al. |
| 5,988,078 A | 11/1999 | Levine |
| 5,990,890 A | 11/1999 | Etheredge |
| 5,990,927 A | 11/1999 | Hendricks et al. |
| 5,999,912 A | 12/1999 | Wodarz et al. |
| 6,002,393 A | 12/1999 | Hite et al. |
| 6,002,394 A | 12/1999 | Schein et al. |
| 6,002,444 A | 12/1999 | Marshall et al. |
| 6,005,562 A | 12/1999 | Shiga et al. |
| 6,005,565 A | 12/1999 | Legall et al. |
| 6,005,566 A | 12/1999 | Jones et al. |
| 6,005,597 A | 12/1999 | Barrett et al. |
| 6,006,257 A | 12/1999 | Slezak |
| 6,008,802 A | 12/1999 | Iki et al. |
| 6,008,803 A | 12/1999 | Rowe et al. |
| 6,011,546 A | 1/2000 | Bertram |
| 6,014,137 A | 1/2000 | Burns |
| 6,014,502 A | 1/2000 | Moraes |
| 6,016,141 A | 1/2000 | Knudson et al. |
| 6,018,372 A | 1/2000 | Etheredge |
| 6,018,768 A | 1/2000 | Ullman et al. |
| 6,020,883 A | 2/2000 | Herz et al. |
| 6,020,929 A | 2/2000 | Marshall et al. |
| 6,025,837 A | 2/2000 | Matthews, III et al. |
| 6,025,886 A | 2/2000 | Koda |
| 6,028,599 A | 2/2000 | Yuen et al. |
| 6,028,600 A | 2/2000 | Rosin et al. |
| 6,029,045 A | 2/2000 | Picco et al. |
| 6,029,176 A | 2/2000 | Cannon |
| 6,029,195 A | 2/2000 | Herz |
| 6,035,304 A | 3/2000 | Machida et al. |
| 6,047,317 A | 4/2000 | Bisdikian et al. |
| 6,049,824 A | 4/2000 | Simonin |
| 6,052,145 A | 4/2000 | Macrae et al. |
| 6,061,060 A | 5/2000 | Berry et al. |
| 6,061,082 A | 5/2000 | Park |
| 6,061,097 A | 5/2000 | Satterfield |
| 6,064,376 A | 5/2000 | Berezowski et al. |
| 6,064,980 A | 5/2000 | Jacobi et al. |
| 6,067,303 A | 5/2000 | Aaker et al. |
| 6,072,460 A | 6/2000 | Marshall et al. |
| 6,075,526 A | 6/2000 | Rothmuller |
| 6,075,551 A | 6/2000 | Berezowski et al. |
| 6,075,575 A | 6/2000 | Schein et al. |
| 6,078,348 A | 6/2000 | Klosterman et al. |
| 6,081,750 A | 6/2000 | Hoffberg et al. |
| 6,081,830 A | 6/2000 | Schindler |
| 6,088,722 A | 7/2000 | Herz et al. |
| 6,091,883 A | 7/2000 | Artigalas et al. |
| 6,098,065 A | 8/2000 | Skillen et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,125,230 A | 9/2000 | Yaginuma |
| 6,133,909 A | 10/2000 | Schein et al. |
| 6,141,003 A | 10/2000 | Chor et al. |
| 6,147,714 A | 11/2000 | Terasawa et al. |
| 6,147,715 A | 11/2000 | Yuen et al. |
| 6,151,059 A | 11/2000 | Schein et al. |
| 6,154,203 A | 11/2000 | Yuen et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A * | 12/2000 | Sitnik ............................ 725/9 |
| 6,160,989 A | 12/2000 | Hendricks et al. |
| 6,163,316 A | 12/2000 | Killian |
| 6,169,542 B1 | 1/2001 | Hooks et al. |
| 6,172,674 B1 | 1/2001 | Etheredge |
| 6,172,677 B1 | 1/2001 | Stautner et al. |
| 6,173,271 B1 | 1/2001 | Goodman et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,186,287 B1 | 2/2001 | Heidenreich et al. |
| 6,186,443 B1 | 2/2001 | Shaffer |
| 6,191,780 B1 | 2/2001 | Martin et al. |
| 6,201,536 B1 | 3/2001 | Hendricks et al. |
| 6,202,212 B1 | 3/2001 | Sturgeon et al. |
| 6,209,129 B1 | 3/2001 | Carr et al. |
| 6,209,130 B1 | 3/2001 | Rector, Jr. et al. |
| 6,216,264 B1 | 4/2001 | Maze et al. |
| 6,237,145 B1 | 5/2001 | Narasimhan et al. |
| 6,237,146 B1 | 5/2001 | Richards et al. |
| 6,239,794 B1 | 5/2001 | Yuen et al. |
| 6,240,555 B1 | 5/2001 | Shoff et al. |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |
| 6,262,721 B1 | 7/2001 | Tsukidate et al. |
| 6,263,501 B1 | 7/2001 | Schein et al. |
| 6,263,507 B1 | 7/2001 | Ahmad et al. |
| 6,268,849 B1 | 7/2001 | Boyer et al. |
| 6,275,268 B1 | 8/2001 | Ellis et al. |
| 6,279,157 B1 | 8/2001 | Takasu |
| 6,282,713 B1 | 8/2001 | Kitsukawa et al. |
| 6,285,713 B1 | 9/2001 | Nakaya et al. |
| 6,286,140 B1 | 9/2001 | Ivanyi |
| 6,289,346 B1 | 9/2001 | Milewski et al. |
| 6,298,482 B1 | 10/2001 | Seidman et al. |
| 6,311,877 B1 | 11/2001 | Yang |
| 6,312,336 B1 | 11/2001 | Handelman et al. |
| 6,320,588 B1 | 11/2001 | Palmer et al. |
| 6,323,911 B1 | 11/2001 | Schein et al. |
| 6,323,931 B1 | 11/2001 | Fujita et al. |
| 6,331,877 B1 | 12/2001 | Bennington et al. |
| 6,335,722 B1 | 1/2002 | Tani et al. |
| 6,341,195 B1 | 1/2002 | Mankovitz et al. |
| 6,342,926 B1 | 1/2002 | Hanafee et al. |
| 6,357,042 B2 | 3/2002 | Srinivasan et al. |
| 6,363,525 B1 | 3/2002 | Dougherty et al. |
| 6,366,890 B1 | 4/2002 | Usrey |
| 6,381,582 B1 | 4/2002 | Walker et al. |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,396,546 B1 | 5/2002 | Alten et al. |
| 6,400,407 B1 | 6/2002 | Zigmond et al. |
| 6,405,371 B1 | 6/2002 | Oosterhout et al. |
| 6,408,437 B1 | 6/2002 | Hendricks et al. |
| 6,411,308 B1 | 6/2002 | Blonstein et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,437,836 B1 | 8/2002 | Huang et al. |
| 6,446,261 B1 | 9/2002 | Rosser |
| 6,453,471 B1 | 9/2002 | Klosterman |
| 6,463,585 B1 | 10/2002 | Hendricks et al. |
| 6,469,753 B1 | 10/2002 | Klosterman et al. |

(56) References Cited

U.S. PATENT DOCUMENTS

| | | |
|---|---|---|
| 6,470,497 B1 | 10/2002 | Ellis et al. |
| 6,477,579 B1 | 11/2002 | Kunkel et al. |
| 6,477,705 B1 | 11/2002 | Yuen et al. |
| 6,486,920 B2 | 11/2002 | Arai et al. |
| 6,493,876 B1 | 12/2002 | DeFreese et al. |
| 6,498,895 B2 | 12/2002 | Young et al. |
| 6,505,348 B1 | 1/2003 | Knowles et al. |
| 6,515,680 B1 | 2/2003 | Hendricks et al. |
| 6,516,323 B1 | 2/2003 | Kamba |
| 6,530,082 B1 | 3/2003 | Del Sesto et al. |
| 6,539,548 B1 | 3/2003 | Hendricks et al. |
| 6,542,169 B1 | 4/2003 | Marshall et al. |
| 6,545,722 B1 | 4/2003 | Schultheiss et al. |
| 6,546,556 B1 | 4/2003 | Kataoka et al. |
| 6,564,378 B1 | 5/2003 | Satterfield et al. |
| 6,564,379 B1 | 5/2003 | Knudson et al. |
| 6,574,424 B1 | 6/2003 | Dimitri et al. |
| 6,588,013 B1 | 7/2003 | Lumley et al. |
| 6,600,364 B1 | 7/2003 | Liang et al. |
| 6,600,503 B2 | 7/2003 | Stautner et al. |
| 6,606,128 B2 | 8/2003 | Hanafee et al. |
| 6,622,306 B1 | 9/2003 | Kamada |
| 6,631,523 B1 | 10/2003 | Matthews, III et al. |
| 6,637,029 B1 | 10/2003 | Maissel et al. |
| 6,651,251 B1 | 11/2003 | Shoff et al. |
| 6,660,503 B2 | 12/2003 | Kierulff |
| 6,661,468 B2 | 12/2003 | Alten et al. |
| 6,665,869 B1 | 12/2003 | Ellis et al. |
| 6,678,706 B1 | 1/2004 | Fishel |
| 6,687,906 B1 | 2/2004 | Yuen et al. |
| 6,698,020 B1 | 2/2004 | Zigmond et al. |
| 6,704,931 B1 | 3/2004 | Schaffer et al. |
| 6,718,551 B1 | 4/2004 | Swix et al. |
| 6,728,967 B2 | 4/2004 | Bennington et al. |
| 6,732,369 B1 | 5/2004 | Schein et al. |
| 6,738,978 B1 | 5/2004 | Hendricks et al. |
| 6,742,183 B1 | 5/2004 | Reynolds et al. |
| 6,745,391 B1 | 6/2004 | Macrae et al. |
| 6,751,800 B1 | 6/2004 | Fukuda et al. |
| 6,756,997 B1 | 6/2004 | Ward, III et al. |
| 6,757,906 B1 | 6/2004 | Look et al. |
| 6,792,618 B1 | 9/2004 | Bendinelli et al. |
| 6,799,326 B2 | 9/2004 | Boylan, III et al. |
| 6,799,327 B1 | 9/2004 | Reynolds et al. |
| 6,828,993 B1 | 12/2004 | Hendricks et al. |
| 6,847,387 B2 | 1/2005 | Roth |
| 6,850,693 B2 | 2/2005 | Young et al. |
| 6,857,131 B1 | 2/2005 | Yagawa et al. |
| 6,868,551 B1 | 3/2005 | Lawler et al. |
| 6,938,208 B2 | 8/2005 | Reichardt |
| 6,973,669 B2 | 12/2005 | Daniels |
| 6,983,478 B1 | 1/2006 | Grauch et al. |
| 7,003,792 B1 | 2/2006 | Yuen |
| 7,028,326 B1 | 4/2006 | Westlake et al. |
| 7,039,935 B2 | 5/2006 | Knudson et al. |
| 7,047,550 B1 | 5/2006 | Yasukawa et al. |
| 7,069,576 B1 | 6/2006 | Knudson et al. |
| 7,100,185 B2 | 8/2006 | Bennington et al. |
| 7,117,518 B1 | 10/2006 | Takahashi et al. |
| 7,185,355 B1 | 2/2007 | Ellis et al. |
| 7,187,847 B2 | 3/2007 | Young et al. |
| 7,266,833 B2 | 9/2007 | Ward, III et al. |
| 7,287,267 B2 | 10/2007 | Knudson et al. |
| 7,293,276 B2 | 11/2007 | Phillips et al. |
| 7,328,450 B2 | 2/2008 | Macrae et al. |
| 7,392,532 B2 | 6/2008 | White et al. |
| 7,398,541 B2 | 7/2008 | Bennington et al. |
| 7,480,929 B2 | 1/2009 | Klosterman et al. |
| 7,487,528 B2 | 2/2009 | Satterfield et al. |
| 7,487,529 B1 | 2/2009 | Orlick |
| 7,493,641 B2 | 2/2009 | Klosterman et al. |
| 7,503,055 B2 | 3/2009 | Reynolds et al. |
| 7,634,786 B2 | 12/2009 | Knee et al. |
| 7,665,109 B2 | 2/2010 | Matthews, III et al. |
| 7,770,196 B1 | 8/2010 | Hendricks |
| 7,779,437 B2 | 8/2010 | Barton |
| 7,996,864 B2 | 8/2011 | Yuen et al. |
| 8,051,450 B2 | 11/2011 | Robarts et al. |
| 8,490,134 B2 | 7/2013 | Gerba et al. |
| 2001/0001160 A1 | 5/2001 | Shoff et al. |
| 2001/0013124 A1 | 8/2001 | Klosterman et al. |
| 2001/0029610 A1 | 10/2001 | Corvin et al. |
| 2001/0042246 A1 | 11/2001 | Yuen et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0042913 A1 | 4/2002 | Ellis et al. |
| 2002/0042914 A1 | 4/2002 | Walker et al. |
| 2002/0042918 A1 | 4/2002 | Townsend et al. |
| 2002/0049973 A1 | 4/2002 | Alten et al. |
| 2002/0056098 A1 | 5/2002 | White |
| 2002/0059602 A1 | 5/2002 | Macrae et al. |
| 2002/0073424 A1 | 6/2002 | Ward et al. |
| 2002/0078450 A1 | 6/2002 | Bennington et al. |
| 2002/0083439 A1 | 6/2002 | Eldering |
| 2002/0092017 A1 | 7/2002 | Klosterman et al. |
| 2002/0120933 A1 | 8/2002 | Knudson et al. |
| 2002/0124249 A1 | 9/2002 | Shintani et al. |
| 2002/0147976 A1 | 10/2002 | Yuen et al. |
| 2003/0005432 A1 | 1/2003 | Ellis et al. |
| 2003/0005445 A1 | 1/2003 | Schein et al. |
| 2003/0110494 A1 | 6/2003 | Bennington et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0196203 A1 | 10/2003 | Ellis et al. |
| 2003/0204847 A1 | 10/2003 | Ellis et al. |
| 2003/0208756 A1 | 11/2003 | Macrae et al. |
| 2003/0208758 A1 | 11/2003 | Schein et al. |
| 2003/0208759 A1 | 11/2003 | Gordon et al. |
| 2004/0003407 A1 | 1/2004 | Hanafee et al. |
| 2004/0049787 A1 | 3/2004 | Maissel et al. |
| 2004/0078809 A1 | 4/2004 | Drazin |
| 2004/0103439 A1 | 5/2004 | Macrae et al. |
| 2004/0111742 A1 | 6/2004 | Hendricks et al. |
| 2004/0133910 A1 | 7/2004 | Gordon et al. |
| 2004/0139465 A1 | 7/2004 | Matthews et al. |
| 2004/0168189 A1 | 8/2004 | Reynolds et al. |
| 2004/0194131 A1 | 9/2004 | Ellis et al. |
| 2004/0194138 A1 | 9/2004 | Boylan et al. |
| 2005/0010949 A1 | 1/2005 | Ward et al. |
| 2005/0015804 A1 | 1/2005 | LaJoie et al. |
| 2005/0097622 A1 | 5/2005 | Zigmond et al. |
| 2005/0155056 A1 | 7/2005 | Knee et al. |
| 2005/0157217 A1 | 7/2005 | Hendricks |
| 2005/0198668 A1 | 9/2005 | Yuen et al. |
| 2005/0204382 A1 | 9/2005 | Ellis |
| 2005/0216936 A1 | 9/2005 | Knudson et al. |
| 2005/0229214 A1 | 10/2005 | Young et al. |
| 2005/0244138 A1 | 11/2005 | O'Connor et al. |
| 2005/0283796 A1 | 12/2005 | Flickinger |
| 2006/0248555 A1 | 11/2006 | Eldering |
| 2007/0016926 A1 | 1/2007 | Ward et al. |
| 2007/0033613 A1 | 2/2007 | Ward et al. |
| 2007/0162934 A1 | 7/2007 | Roop et al. |
| 2007/0186240 A1 | 8/2007 | Ward et al. |
| 2007/0234393 A1 | 10/2007 | Walker et al. |
| 2008/0066111 A1 | 3/2008 | Ellis et al. |
| 2008/0127265 A1 | 5/2008 | Ward et al. |
| 2008/0127266 A1 | 5/2008 | Ward et al. |
| 2008/0178216 A1 | 7/2008 | Bennington et al. |
| 2008/0178221 A1 | 7/2008 | Schein et al. |
| 2008/0178222 A1 | 7/2008 | Bennington et al. |
| 2008/0178223 A1 | 7/2008 | Kwoh et al. |
| 2008/0184286 A1 | 7/2008 | Kwoh et al. |
| 2008/0184315 A1 | 7/2008 | Ellis et al. |
| 2008/0189744 A1 | 8/2008 | Schein et al. |
| 2008/0235725 A1 | 9/2008 | Hendricks |
| 2009/0193458 A1 | 7/2009 | Finseth et al. |

(56) References Cited

U.S. PATENT DOCUMENTS

| | | |
|---|---|---|
| 2010/0275230 A1 | 10/2010 | Yuen et al. |
| 2010/0319013 A1 | 12/2010 | Knudson et al. |
| 2011/0035771 A1 | 2/2011 | Ward, III et al. |
| 2011/0131601 A1 | 6/2011 | Alten et al. |
| 2011/0167451 A1 | 7/2011 | Yuen et al. |
| 2011/0276995 A1 | 11/2011 | Alten et al. |

FOREIGN PATENT DOCUMENTS

| | | |
|---|---|---|
| AU | 733993 B2 | 5/2001 |
| AU | 760568 B2 | 5/2003 |
| AU | 765648 B2 | 9/2003 |
| CA | 1030505 A1 | 5/1978 |
| CA | 1187197 A1 | 5/1985 |
| CA | 1188811 A1 | 6/1985 |
| CA | 1196082 A1 | 10/1985 |
| CA | 1200911 A1 | 2/1986 |
| CA | 1203625 A1 | 4/1986 |
| CA | 2151458 A1 | 6/1994 |
| CA | 2164608 A1 | 12/1994 |
| CA | 2285645 A1 | 7/1998 |
| CA | 2297039 A1 | 1/1999 |
| CA | 2312326 A1 | 6/1999 |
| CA | 2322217 A1 | 9/1999 |
| CA | 2513282 A1 | 11/1999 |
| CN | 1226030 A | 8/1999 |
| CN | 1555191 | 12/2004 |
| DE | 29 18 846 | 11/1980 |
| DE | 3246225 A1 | 6/1984 |
| DE | 3337204 | 4/1985 |
| DE | 36 21 263 A1 | 1/1988 |
| DE | 3702220 A1 | 8/1988 |
| DE | 3909334 A1 | 9/1990 |
| DE | 41 43 074 A1 | 7/1992 |
| DE | 4201031 A1 | 7/1993 |
| DE | 4440419 A1 | 5/1996 |
| DE | 19 531 121 A1 | 2/1997 |
| DE | 19 740 079 A1 | 3/1999 |
| DE | 19 931 046 A1 | 1/2001 |
| DE | 42 90 947 B4 | 11/2006 |
| EP | 0 148 733 A1 | 7/1985 |
| EP | 0 222 025 A1 | 5/1987 |
| EP | 0 229 526 A2 | 7/1987 |
| EP | 0 239 884 A1 | 10/1987 |
| EP | 0337336 A2 | 10/1989 |
| EP | 0339675 | 11/1989 |
| EP | 0 363 847 A1 | 4/1990 |
| EP | 0 393 555 | 10/1990 |
| EP | 0396062 A2 | 11/1990 |
| EP | 0 401 015 A2 | 12/1990 |
| EP | 0401930 | 12/1990 |
| EP | 0408892 A1 | 1/1991 |
| EP | 0420123 A2 | 4/1991 |
| EP | 0424648 A2 | 5/1991 |
| EP | 0444496 | 9/1991 |
| EP | 0447968 A2 | 9/1991 |
| EP | 0477756 A2 | 4/1992 |
| EP | 0 489 387 A2 | 6/1992 |
| EP | 0488379 | 6/1992 |
| EP | 497 235 | 8/1992 |
| EP | 0532322 A2 | 3/1993 |
| EP | 0536901 A2 | 4/1993 |
| EP | 0550911 A1 | 7/1993 |
| EP | 0 560 593 | 9/1993 |
| EP | 0 572 090 | 12/1993 |
| EP | 0 620 689 A1 | 10/1994 |
| EP | 0624039 A2 | 11/1994 |
| EP | 0 673 164 A1 | 9/1995 |
| EP | 0 682 452 A2 | 11/1995 |
| EP | 0721253 A2 | 7/1996 |
| EP | 0725539 A2 | 8/1996 |
| EP | 0752767 A2 | 1/1997 |
| EP | 0753964 | 1/1997 |
| EP | 0762751 A2 | 3/1997 |
| EP | 0772360 | 5/1997 |
| EP | 0774866 A2 | 5/1997 |
| EP | 0775417 A1 | 5/1997 |
| EP | 0784405 | 7/1997 |
| EP | 0 804 028 A1 | 10/1997 |
| EP | 0 806 111 A1 | 11/1997 |
| EP | 0805594 A2 | 11/1997 |
| EP | 0822718 | 2/1998 |
| EP | 0827340 A2 | 3/1998 |
| EP | 0 836 321 | 4/1998 |
| EP | 0834798 | 4/1998 |
| EP | 0848554 A2 | 6/1998 |
| EP | 0849948 | 6/1998 |
| EP | 0 854645 | 7/1998 |
| EP | 0851681 | 7/1998 |
| EP | 0852442 A1 | 7/1998 |
| EP | 0854654 | 7/1998 |
| EP | 0880856 A1 | 12/1998 |
| EP | 0905985 A2 | 3/1999 |
| EP | 0924927 | 6/1999 |
| EP | 0935393 A2 | 8/1999 |
| EP | 0944253 A1 | 9/1999 |
| EP | 0963119 A1 | 12/1999 |
| EP | 0988876 A1 | 3/2000 |
| EP | 1 058 999 A1 | 12/2000 |
| EP | 1067792 A2 | 1/2001 |
| EP | 1 093 305 A2 | 4/2001 |
| EP | 1095504 A2 | 5/2001 |
| EP | 1213919 A2 | 6/2002 |
| EP | 1036466 | 3/2003 |
| EP | 1763234 A2 | 3/2007 |
| FR | 2662895 A1 | 12/1991 |
| GB | 1 554 411 | 10/1979 |
| GB | 2034995 A | 6/1980 |
| GB | 2126002 A | 3/1984 |
| GB | 2185670 A | 7/1987 |
| GB | 2217144 A | 10/1989 |
| GB | 2256546 A | 12/1992 |
| GB | 2264409 A | 8/1993 |
| GB | 2 275 585 A | 8/1994 |
| GB | 2305049 A | 3/1997 |
| GB | 2309134 A | 7/1997 |
| HK | 1035285 | 3/2005 |
| JP | 58137334 A | 8/1983 |
| JP | 58137344 A | 8/1983 |
| JP | 58196738 A | 11/1983 |
| JP | 58210776 A | 12/1983 |
| JP | 59141878 A | 8/1984 |
| JP | 61050470 A | 3/1986 |
| JP | 61074476 A | 4/1986 |
| JP | 62-060370 | 3/1987 |
| JP | 62060384 A | 3/1987 |
| JP | 63234679 A | 9/1988 |
| JP | 01307944 A | 12/1989 |
| JP | 02048879 A | 2/1990 |
| JP | 02-119307 A | 5/1990 |
| JP | 06-141250 | 5/1990 |
| JP | 2189753 A | 7/1990 |
| JP | 03063990 A | 3/1991 |
| JP | 03-167975 A | 7/1991 |
| JP | 3178278 A | 8/1991 |
| JP | 03-214919 A | 9/1991 |
| JP | 03-243076 A | 10/1991 |
| JP | 09-009244 | 1/1992 |
| JP | 04-44475 | 2/1992 |
| JP | 04-162889 A | 6/1992 |
| JP | 04-180480 A | 6/1992 |
| JP | 04227380 | 8/1992 |
| JP | 04-335395 A | 11/1992 |
| JP | 4340258 A | 11/1992 |
| JP | 05-103281 A | 4/1993 |
| JP | 05-122692 A | 5/1993 |
| JP | 05-183826 | 7/1993 |
| JP | 05284437 A | 10/1993 |
| JP | 05-339100 A | 12/1993 |
| JP | 06021907 | 1/1994 |
| JP | 06-90408 | 3/1994 |
| JP | 60-61935 A | 3/1994 |
| JP | 06-124309 | 5/1994 |
| JP | 06-133235 A | 5/1994 |

(56) References Cited

FOREIGN PATENT DOCUMENTS

| | | |
|---|---|---|
| JP | 06504165 | 5/1994 |
| JP | 06-164973 | 6/1994 |
| JP | 06-295312 A | 10/1994 |
| JP | 0723356 | 1/1995 |
| JP | 07020254 | 1/1995 |
| JP | 07-050259 | 2/1995 |
| JP | 07-076592 | 3/1995 |
| JP | 07-135621 A | 5/1995 |
| JP | 07123326 | 5/1995 |
| JP | 07147657 A | 6/1995 |
| JP | 7-262200 A | 10/1995 |
| JP | 07-284033 A | 10/1995 |
| JP | 07-288759 | 10/1995 |
| JP | 07-321748 | 12/1995 |
| JP | 08-32528 | 2/1996 |
| JP | 0832538 | 2/1996 |
| JP | 08-137334 A | 5/1996 |
| JP | 08125497 | 5/1996 |
| JP | 8-506469 | 7/1996 |
| JP | 08-196738 A | 8/1996 |
| JP | 08-234709 | 9/1996 |
| JP | 08251122 | 9/1996 |
| JP | 08275077 | 10/1996 |
| JP | 08289281 A | 11/1996 |
| JP | 08-331546 A | 12/1996 |
| JP | 09-37168 | 2/1997 |
| JP | 09037151 A | 2/1997 |
| JP | 09037171 | 2/1997 |
| JP | 09037172 A | 2/1997 |
| JP | 9-65321 | 3/1997 |
| JP | 09-102827 A | 4/1997 |
| JP | 09-114781 | 5/1997 |
| JP | 09 162818 | 6/1997 |
| JP | 09-247565 A | 9/1997 |
| JP | 092-44475 A | 9/1997 |
| JP | 09-261609 A | 10/1997 |
| JP | 10-501936 | 2/1998 |
| JP | 10042218 | 2/1998 |
| JP | 10-143340 | 5/1998 |
| JP | 10-143349 | 5/1998 |
| JP | 2838892 | 10/1998 |
| JP | 10-512420 | 11/1998 |
| JP | 2001-213595 | 8/2001 |
| JP | 2001-513595 | 9/2001 |
| JP | 2002-279969 | 9/2002 |
| JP | 2003-189200 A | 7/2003 |
| JP | 4062577 | 3/2008 |
| JP | 4510282 | 7/2010 |
| WO | WO-86/01359 A1 | 2/1986 |
| WO | WO-86/01962 | 3/1986 |
| WO | WO-87/03766 | 6/1987 |
| WO | WO-88/04057 A1 | 6/1988 |
| WO | WO-88/04507 | 6/1988 |
| WO | WO-8902682 A1 | 3/1989 |
| WO | WO-89/03085 | 4/1989 |
| WO | WO-89/12370 | 12/1989 |
| WO | WO-90/01243 A1 | 2/1990 |
| WO | WO-90/15507 | 12/1990 |
| WO | WO-9100670 | 1/1991 |
| WO | WO-91/05436 A1 | 4/1991 |
| WO | WO-91/06367 A2 | 5/1991 |
| WO | WO-91/06912 A1 | 5/1991 |
| WO | WO-91/18476 A1 | 11/1991 |
| WO | WO-92/04801 | 3/1992 |
| WO | WO-9304473 | 3/1993 |
| WO | WO-9305452 A1 | 3/1993 |
| WO | WO-93/11638 | 6/1993 |
| WO | WO-93/11639 | 6/1993 |
| WO | WO-93/11640 | 6/1993 |
| WO | WO-93/23957 A1 | 11/1993 |
| WO | WO-94/13107 | 6/1994 |
| WO | WO-94/14282 A1 | 6/1994 |
| WO | WO-94/14283 A1 | 6/1994 |
| WO | WO-94/14284 A1 | 6/1994 |
| WO | WO-9414281 A1 | 6/1994 |
| WO | WO-94/16441 A1 | 7/1994 |
| WO | WO-9421085 A1 | 9/1994 |
| WO | WO-94/23383 A1 | 10/1994 |
| WO | WO-94/29811 A1 | 12/1994 |
| WO | WO-95/01056 | 1/1995 |
| WO | WO-95/01057 A1 | 1/1995 |
| WO | WO-95/01058 A1 | 1/1995 |
| WO | WO-95/01059 A1 | 1/1995 |
| WO | WO-95/06389 A1 | 3/1995 |
| WO | WO-95/07003 | 3/1995 |
| WO | WO-95/10910 | 4/1995 |
| WO | WO-95/15658 A1 | 6/1995 |
| WO | WO-95/16568 A1 | 6/1995 |
| WO | WO-9515649 A1 | 6/1995 |
| WO | WO-9515657 A1 | 6/1995 |
| WO | WO-95/19092 A1 | 7/1995 |
| WO | WO-95/26608 A1 | 10/1995 |
| WO | WO-95/28055 A1 | 10/1995 |
| WO | WO-95/28799 A1 | 10/1995 |
| WO | WO-95/30961 A1 | 11/1995 |
| WO | WO-95/32585 | 11/1995 |
| WO | WO-95/32587 | 11/1995 |
| WO | WO-9530302 A1 | 11/1995 |
| WO | WO-9531069 | 11/1995 |
| WO | WO-9532583 A1 | 11/1995 |
| WO | WO-96/07270 A1 | 3/1996 |
| WO | WO-96/08109 A1 | 3/1996 |
| WO | WO-96/08923 A1 | 3/1996 |
| WO | WO-96/09721 A1 | 3/1996 |
| WO | WO-9608113 A1 | 3/1996 |
| WO | WO-96/13932 A1 | 5/1996 |
| WO | WO-9613935 A1 | 5/1996 |
| WO | WO-96/17467 A2 | 6/1996 |
| WO | WO-9617473 | 6/1996 |
| WO | WO 9621990 A2 | 7/1996 |
| WO | WO-96/26605 | 8/1996 |
| WO | WO-9627270 A1 | 9/1996 |
| WO | WO-9627982 | 9/1996 |
| WO | WO-96/31980 A1 | 10/1996 |
| WO | WO-96/34467 A1 | 10/1996 |
| WO | WO-96/34486 A1 | 10/1996 |
| WO | WO-96/34491 A1 | 10/1996 |
| WO | WO-96/38799 A1 | 12/1996 |
| WO | WO-96/41477 A1 | 12/1996 |
| WO | WO-96/41478 | 12/1996 |
| WO | WO-9641471 A1 | 12/1996 |
| WO | WO-97/02702 A2 | 1/1997 |
| WO | WO-97/04595 A1 | 2/1997 |
| WO | WO-9707656 | 3/1997 |
| WO | WO-97/12486 | 4/1997 |
| WO | WO-97/13368 | 4/1997 |
| WO | WO-97/17774 A1 | 5/1997 |
| WO | WO-97/18675 | 5/1997 |
| WO | WO-97/19555 A1 | 5/1997 |
| WO | WO-97/26612 A1 | 7/1997 |
| WO | WO-9723997 A1 | 7/1997 |
| WO | WO-97/29458 A1 | 8/1997 |
| WO | WO-97/31480 | 8/1997 |
| WO | WO-9734414 | 9/1997 |
| WO | WO-97/41673 A2 | 11/1997 |
| WO | WO-97/42763 | 11/1997 |
| WO | WO-97/48230 | 12/1997 |
| WO | WO-97/49237 | 12/1997 |
| WO | WO-97/49241 | 12/1997 |
| WO | WO-97/49242 | 12/1997 |
| WO | WO-9748228 A1 | 12/1997 |
| WO | WO-98/00975 A1 | 1/1998 |
| WO | WO-98/00976 | 1/1998 |
| WO | WO-98/06219 | 2/1998 |
| WO | WO-98/10589 A1 | 3/1998 |
| WO | WO-98/16062 | 4/1998 |
| WO | WO-98/17064 A1 | 4/1998 |
| WO | WO-98/20675 A1 | 5/1998 |
| WO | WO-98/26584 | 6/1998 |
| WO | WO-98/27723 | 6/1998 |
| WO | WO-9826569 A2 | 6/1998 |
| WO | WO-98/28906 A2 | 7/1998 |
| WO | WO-98/31148 A1 | 7/1998 |
| WO | WO-98/37695 | 8/1998 |

(56) References Cited

FOREIGN PATENT DOCUMENTS

| | | |
|---|---|---|
| WO | WO-98/39893 A2 | 9/1998 |
| WO | WO-98/41020 A1 | 9/1998 |
| WO | WO-98/43183 A1 | 10/1998 |
| WO | WO-98/43406 A1 | 10/1998 |
| WO | WO-98/47279 | 10/1998 |
| WO | WO-98/48566 A2 | 10/1998 |
| WO | WO-98/56172 A1 | 12/1998 |
| WO | WO-98/56712 A1 | 12/1998 |
| WO | WO-99/01984 A1 | 1/1999 |
| WO | WO-99/04561 | 1/1999 |
| WO | WO-99/07142 A1 | 2/1999 |
| WO | WO-99/14947 A1 | 3/1999 |
| WO | WO-9918722 | 4/1999 |
| WO | WO-99/22502 A1 | 5/1999 |
| WO | WO-99/29109 A1 | 6/1999 |
| WO | WO-99/30491 A1 | 6/1999 |
| WO | WO-99/31480 A1 | 6/1999 |
| WO | WO-99/33265 A1 | 7/1999 |
| WO | WO-9939280 | 8/1999 |
| WO | WO-99/45700 | 9/1999 |
| WO | WO-99/45701 A1 | 9/1999 |
| WO | WO-99/45702 | 9/1999 |
| WO | WO-99/52285 A1 | 10/1999 |
| WO | WO-99/56466 | 11/1999 |
| WO | WO-99/56473 A1 | 11/1999 |
| WO | WO-99/60783 | 11/1999 |
| WO | WO-99/60789 | 11/1999 |
| WO | WO-00/04706 A2 | 1/2000 |
| WO | WO-00/04708 A1 | 1/2000 |
| WO | WO-00/04709 A1 | 1/2000 |
| WO | WO-0002380 A2 | 1/2000 |
| WO | WO-0005889 A1 | 2/2000 |
| WO | WO-00/11865 A1 | 3/2000 |
| WO | WO-00/13415 A2 | 3/2000 |
| WO | WO-00/14951 A1 | 3/2000 |
| WO | WO-00/16548 | 3/2000 |
| WO | WO-00/28734 | 5/2000 |
| WO | WO-0027122 A1 | 5/2000 |
| WO | WO-00/33560 A2 | 6/2000 |
| WO | WO-00/33573 A1 | 6/2000 |
| WO | WO-0033160 A2 | 6/2000 |
| WO | WO-0033224 A1 | 6/2000 |
| WO | WO-00/40025 A1 | 7/2000 |
| WO | WO-00/49801 A1 | 8/2000 |
| WO | WO-00/57645 A1 | 9/2000 |
| WO | WO-00/59220 A1 | 10/2000 |
| WO | WO-00/79798 | 12/2000 |
| WO | WO-01/01677 A1 | 1/2001 |
| WO | WO-01/06784 A2 | 1/2001 |
| WO | WO-01/15438 A1 | 3/2001 |
| WO | WO-0119086 | 3/2001 |
| WO | WO-01/35662 A1 | 5/2001 |
| WO | WO-0146869 | 6/2001 |
| WO | WO-0150743 | 7/2001 |
| WO | WO-0158158 | 8/2001 |
| WO | WO-01/75649 A2 | 10/2001 |
| WO | WO-0189213 A1 | 11/2001 |
| WO | WO-02/31731 A2 | 4/2002 |
| WO | WO-02/84992 A2 | 10/2002 |

OTHER PUBLICATIONS

U.S. Appl. No. 09/330,792, filed Jun. 11, 1999, Knudson et al.
U.S. Appl. No. 09/332,244, filed Jun. 11, 1999, Ellis et al.
U.S. Appl. No. 09/356,268, filed Jul. 16, 1999, Rudnick et al.
272OR Satellite Receiver User's Guide, General Instrument, 1991, pp. 58-61.
Addressable Converters: A New Development at CableData, via Cable, vol. 1, No. 12, Dec. 1981.
Advertisement for "TV Decisions," *Cable Vision*, Aug. 4, 1986.
Alexander, Michael "Visualizing cleared-off desktops," *Computerworld*, May 6, 1991, p. 20.
Antonoff, M., "Stay Tuned for Smart TV," *Popular Science*, Nov. 1990, pp. 62-65.
Antonoffs, "Interactive Television," *Popular Science*, Nov. 1992, pp. 92-128.
Bach, U. et al., "Multimedia TV Set, Part 1" Radio-Fernsehen Elektronik (RFE), Sep. 1996, pp. 28, 30, 31. (English language translation attached.).
Bach, U. et al., "Multimedia TV Set, Part 2 and Conclusion," Radio-Fernsehen Elektronik (RFE), Oct. 1996, pp. 38-40. (English language translation attached.).
Baer, R.H, "Innovative Add-On TV Products," IEEE Transactions on Consumer Electronics, vol. CE-25, Nov. 1979, pp. 765-771.
Beddow, "The Virtual Channels Subscriber Interface," Communications Technology, Apr. 30, 1992.
Bell Atlantic Buys Cable TV Company for $22bn, Financial Times (London), Oct. 14, 1993 p. 65.
Bensch, U., "VPV Videotext Programs Videorecorder," *IEEE Paper*, Jun. 1988, pp. 788-792.
Berniker, "TV Guide going online", Broadcasting & Cable, pp. 49-52, Jun. 13, 1994.
Bertuch, "New Realities for PCs: Multimedia between aspiration and commerce," (translation), Exhibit NK 12 of TechniSat's nullity action against EP'111, Issue 10, pp. 40-46 (1991).
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Brochure, "A New Approach to Addressability," CableData, undated.
Brochure, "Westar and Videotoken Network Present the CableComputer," Revised Aug. 15, 1985 (Plaintiff's 334).
Brochure, Time Inc., "Now, Through the Advances of the Computer Age, You Can Get the Information You Want, When You Want It. Instantly and Conveniently, on Your Home TV Screen," Time Teletext, Time Video Information Services, Inc., undated (V 79167-79175).
Brochure, VTN "*Videotoken Network, New Dimension Television,*" Dec. 1985 (Plaintiff's Exhibit 313).
Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.
CableComputer User's Guide, Rev. 1, Dec. 1985.
*Cable Computer User's Guide*, Rev. 1, Dec. 1985 (Plaintiff's Exhibit 289).
Cable Television Equipment, Jerrold Communications Publication, dated 1992 and 1993, pp. 8-2.1 to 8-6 and 8-14.1 to 8-14.3.
CableData, *Roseville Consumer Presentation*, Mar. 1985.
Carne, E.B., "The Wired Household," *IEEE Spectrum*, vol. 16 No. 10, Oct. 1979, pp. 61-66.
Chan, Patrick P., "Learning Considerations in User Interface Design: The Room Model," Publication of the Software Portability Laboratory, University of Waterloo, Ontario, Canada, Jul. 1984.
Christodoulakis, Steven and Graham, Stephen "*Browsing Within Time-Driven Multimedia Documents,*" publication of the Institute for Computer Research, University of Waterloo, Waterloo, Ontario, Canada Jul. 1988 pp. 219-227.
Communication of a Notice of Opposition, European Patent Application No. 08103167.6, Jan. 11, 2012, 24 pages.
Computer Network: Current Status and Outlook on Leading Science and Technology, Bureau of Science & Technology (Japan), vol. 1, Dec. 1986.
Contents of the website of StarSight Telecast, Inc. (http://www.StarSight.com) as of Apr. 21, 2004.
Office Actions and Corresponding Replies in relation to U.S. Pat. No. 7,398,541 issued Jul. 8, 2008.
Office Actions and Corresponding Replies in relation to U.S. Pat. No. 7,487,529 issued Feb. 3, 2009.
Office Actions and Corresponding Replies in relation to U.S. Appl. No. 10/347,673, filed Jan. 17, 2003.
U.S. Appl. No. 60/179,548, filed Feb. 1, 2000.

(56) References Cited

OTHER PUBLICATIONS

Cox, J. et al, "Extended Services in a Digital Compression System," Proceedings from Eleven Technical Sessions: 42nd Annual Convention and Exposition of the National Cable Television Association, Jun. 1993, pp. 185-191.
Creation/Modification of the Audio Signal Processor Setup for a PC Audio Editor, IBM Technical Disclosure Bulletin, vol. 30, No. 10, Mar. 1988, pp. 367-376.
D2B-Home Bus Fur Audio and Video, Selektor, Apr. 1990, pp. 10, 12.
Damouny, N.G., "Teletext Decoders—Keeping Up With the Latest Advances," IEEE Transactions on Consumer Electronics, vol. CE-30, No. 3, Aug. 1984, pp. 429-435.
Davic Digital Audio-Visual Council, DAVIC 1.5 Specification, Baseline Document 1, Revised 4.0, Applications for Home Storage and Internet Based Systems, Published by Digital Audio-Visual Council 1995-1999.
Davis, TV Guide on Screen, "Violence on Television", House of Representatives, Committee on Energy and Commerce, Subcommittee on Telecommunications and Finance, pp. 93-163, Jun. 25, 1993.
Dec., Presenting JAVA, "Understanding the Potential of Java and the Web", pp. 1-208, © 1995 by Sams.net Publishing.
Declaration Under 37 C.F.R. § 1.132 of Richard E. Glassberg, signed Oct. 20, 2006, filed Oct. 24, 2006, from U.S. Appl. No. 10/346,266.
"Development Study and Research Report on New Media Interface Technology: Status & Issues Related to Combining Databases & new Media," Japan Society of Data Communication, Mar. 1986.
Dial M for Movie, Fun kschau Nov. 1994 Perspektiven, Video on Demand, pp. 78-79. (English language translation attached).
Digital TV, SMPTE Journal, pp. 727-732, Oct. 1997.
Digital TV-at a price, New Scientist, Sep. 15,1983, vol. 99. No. 1375, p. 770.
Digital Video Broadcasting (DVB); DVB specification for data broadcasting, European Telecommunication Standards Institute, Draft EN 301 192 V1.2.1 (Jan. 1999).
Dinwiddle et al., "Combined-User Interface for Computers, Televison, Video Recorders, and Telephone, etc." IBM Technical Disclosure Bulletin, vol. 33(3B), pp. 116-118 (1990).
DiRosa, S. "BIGSURF Netguide", Jul. 1995, vol. 3.1 (Sections 18,21, and 28—renumbered as pp. 1-27).
'Duck Tales,'(1987)[TV Series 1987-1990], Internet Movie Database (IMDB) [Retrieved on Apr. 7, 2007].
Eckhoff, "TV Listing Star on the Computer", Central Penn Business Journal/High Beam Research, pp. 1-4, Mar. 15, 1996.
Edwardson, S.M., & Gee, A., "CEEFAX: A Proposed New Broadcasting Service," Journal of the SMPTE, Jan. 1974, vol. 83 No. 1, pp. 14-19.
Eitz, Gerhard, "Zukünftige Informations-und Datenangebote beim digitalen Femsehen-EPG Und 'Lesezeichen'," RTM Rundfunktechnische Mitteilungen, Jun. 1997, vol. 41, pp. 67-72.
Eitz et al., "Videotext Programmiert Videoheimgerate," Rundfunktech Mitteilungen, Jahrg. 30, H.5, 1986, S. 223 bis 229 (English translation attached).
Electronic Programme Guide (EPG); Protocol for a TV Guide using electronic data transmission, by European Telecommunication Standards Institute, May 1997, Valbonne, France, publication No. ETS 300 707.
Enhanced Content Specification, "ATVEF," from the internet at http://www.atvef.com/library/spec.html, printed Aug. 22, 2001, the document bears a Copyright date of 1998, 1999, 2000.
European Search Report dated Nov. 19, 2002 from European Application No. 989446111.7.
European Telecommunication Standard, "*Electronic Programme Guide (EPG); Protocol for a TV Guide using electronic data transmission,*" pp. 1-45, sections 1-11.12.7 and annex A-P, bearing a date of May 1997.
European Telecommunications Standards: Digital Broadcasting Systems for Television Sound and Data Services; Specification for Service Information (SI) in Digital Video Broadcasting (DVB) Systems, European Telecommunications Standards Institute, Dec. 1994.
Extended European Search Report for EP10183222 dated Jun. 20, 2011.
Facsimile Transmission, NHK Research Monthly Report, Dec. 1987(Unknown author).
Fuller, C., Streaming gijutsu no genzai Web video system no gaiyou [Current Streaming Technology, Outline of Web Video System], UNIX Magazine, Japan, ASCII K.K., Mar. 1, 2000, vol. 15, No. 3, p. 65-72.
Getting Started Installation Guide, "Using StarSight 1" Manual, and Remote Control "Quick Reference Guide.".
Hartwig, Rautenberg, Bollmann, "Broadcasting and Processing of Program Guides for Digital TV," SMPTE Journal, pp. 727-732, Oct. 1997.
Hedger, J., "Telesoftware: Home Computing via Broadcast Teletext," IEEE Transactions on Consumer Electronics, vol. CE-25, No. 3, Jul. 1979, pp. 279-287.
Hiroshi Ishii et al, "Clearface: Translucent Multiuser Interface for TeamWorkStation," ECSCW, Sep. 1991, pp. 6-10.
Hiroshi Ishii et al, "Toward an Open Shared Workspace: Computer and Video Fusion Approach of Team Workstation," Communications of the ACM, Dec. 1991, vol. 34 No. 12, pp. 37-50.
Hirotada Ueda et al, "Impact: An Interactive Natural-Motion-Picture Dedicated Multi-Media Authoring System," Communications of the ACM, Mar. 1991, pp. 343-350.
Hofmann, Neumann, Oberlies & Schadwinkel, "Videotext Programmiert Videorecorder," *Rundfunktechnischen Mitteilungen*, (*Broadcast Engineering Reports*), vol. 26 No. 6, pp. 254-257, Nov.-Dec. 1982.
Installation Guide, "Getting Started 1" Manual, and Remote Control "Quick Reference Guide.".
Instruction Manual "Using StarSight 2" Published before Apr. 19, 1995.
Instructional Manual, "Sonic the Hedgehog," Sega of America, 1992.
Interactive Computer Conference Server, IBM Technical Bulletin, vol. 34, No. 7A, Dec. 1991, pp. 375-377.
Interface Device for Conventional TVs to Improve Functionality, IBM Technical Disclosure Bulletin, vol. 36, No. 7, Jul. 1993, pp. 53-54.
International Search Report for PCT/US95/11173 dated Dec. 14, 1995.
International Search Report for PCT/US99/04163 dated Jun. 23, 1999.
International Search Report for PCT/US99/08842 dated Jul. 7, 1999.
IPG Attitude and Usage Study, prepared by Lieberman Research Worldwide for Gemstar-TV Guide International, Oct. 2002.
James Sorce, David Fay, Brian Raila and Robert Virzi, Designing a Broadband Residential Entertainment Service: A Case Study, GTE Laboratories Incorporated, undated, pp. 141-148.
James, A., "Oracle Broadcasting the Written Word," Wireless World, Jul. 1973, vol. 79 No. 1453, pp. 314-316.
Judice, C.N., "Move Over Cable, Here Comes Video via Voice Lines," Network World, Sep. 1986, p. 26.
Kai et al "Development of a Simulation System for Integrated Services Television," Report from Information Processing Society of Japan, Japan, Sep. 13, 1996, vol. 96, No. 90 pgs.
Karstad, K., "Microprocessor Control for Color-TV Receivers," IEEE Transactions on Consumer Electronics, vol. CE-26, May 1980, pp. 149-155.
Kornhaas, W., "Von der Textprogrammierung uber TOP zum Archivsystem," *Radio Fernsehen Elektronik*, vol. 40, No. 8, Aug. 30, 1991, pp. 465-468, XP 000240875 Veb Verlag Technik. Berlin, DE ISSN: 1436-1574.
Letter from G. Knapp of CableData to R. Hansen of Weststar Communications, Inc., Mar. 19, 1985.
Letter from StarSight Telecast, Inc. to a StarSight IPG subscriber (with subscriber name, address and account number redacted) notifying the subscriber of termination of the StarSight IPG, 2003.

(56) References Cited

OTHER PUBLICATIONS

Listing of computer code for operating system within the Cable Computer in 1985 (Plaintiff's Exhibit 298).
Listing of computer code for Video HTU Program (Plaintiff's Exhibit 299).
Lists> What's on Tonite! TV Listings (fwd), Internet article (On line), Jan. 28, 1995, XP 002378869 [Retrieved on Apr. 28, 2006].
Lowenstein, R.L. and Alter, H.E., "The Inevitable March of Videotex," *Technology Review*, vol. 88, Oct. 1985, p. 22.
M/A-COM, Inc., "*Videocipher II Satellite Descrambler Owner's Manual*," dated Prior Feb. 1986, pp. 1-17.
Mack Daily, "Addressable Decoder with Downloadable Operation," Proceedings from the Eleven Technical Sessions, 42nd Annual Convention and Exposition of the NCTA, Jun. 6-9, 1993, pp. 82-89.
Make Room for POP, Popular Science, Jun. 1993, p. 4.
Mannes, "List-Mania, On-Screen, interactive TV guides that can program your VCR are just around the corner," Video Review, May 1992, pp. 34-36.
Mannes, G., "Smart Screens: Development of Personal Navigation Systems for TV Viewers," Video Magazine, Dec. 1993.
Mar. 19, 1985 letter from G. Knapp of CableData to R. Hansen of Weststar Communications, Inc. (Plaintiff's Exhibit 325).
Markowitz, A. "*Companies Jump on Interactive Bandwagon*," Discount Store News, Dec. 6, 1993, pp. 4 and 131.
McKenzie, G.A., "Oracle—An Information Broadcasting Service Using Data Transmission in the Vertical Interval," *Journal of the SMPTE*, Jan. 1974, vol. 83 No. 1, pp. 6-10.
Merrell, R.G., "Tac Timer," 1986 NCTA Technical Papers, pp. 203-206.
Miller, Matthew D., "A Scenario for the Deployment of Interactive Multimedia Cable Television Systems in the United States in the 1990's", Proceedings of the IEEE, vol. 82, pp. 585-589, Apr. 1994.
Minutes of Oral Proceedings in EP Appeal No. T 1288/04 Held on May 3, 2004 for EP Application No. EP002009741.0, Applicant E-Guide, Inc.
Minutes of Oral Proceeding in EP Application No. 04 075 205.7 dated Dec. 21, 2009.
MSI Datacasting Systems, TV Communications Journal, Jan. 1973.
Neumann, Andreas, "WDR Online Aufbau und Perspektiven Automatisierter Online-Dienste im WDR," *RTM Rundfunktechnische Mitteilungen*, vol. 41, pp. 56-66, Jun. 1997.
No subject, "Tom Schauer (tschauer@moscow.com)Thu, Sep. 28, 1995 16:46:48-700," XP-002378870 [Retrieved from the Internet Apr. 28, 2006].
Oberlies, et al.; "VPS-Anzeige Und Uberwachungsgerat", Rundfunktechnische Mitteilungen, vol. 30, No. 1 Jan. 1986-Feb. 1986, Norderstedt (DE).
Office Action dated Sep. 8, 2006 re U.S. Appl. No. 10/453,388.
Open TV fur interaktives Fernsehen, Trend and Technik, 9-95 RFE, p. 100. (English language translation attached).
Open TV Launches OpenStreamer™ Technology for Broadcasters to Deliver First Ever Real-Time Digital Interactive Television, from the internet at http://www.opentv.com/news/openstreamer_press_final.htm, printed on Jun. 28, 1999, the document bears a copyright date of 1999.
"OpenTV(R) and Interactive Channel Form Strategic Alliance to Deliver Interactive Programming to Satellite Television Subscribers", from the Internet at Http://www.opentv.com/news/interactivechannelfinal.htm, printed on Jun. 8, 1999.
Panasonic TX-33A1G Operating Instructions (undated).
Patent Abstracts of Japan vol. 017, No. 494, Sep. 7, 1993 and JP 05 122692 A (Pioneer Electron Corp), May 18, 1993.
Patent Abstracts of Japan vol. 098, No. 001, Jan. 30, 1998 and JP 09 247565 A (Sony Corp), Sep. 19, 1997.
Pfister, Larry T., "Teletext: Its Time Has Come," Prepared for the IGC Videotext / Teletext Conference, Andover, Massachusetts, Dec. 14, 1982, pp. 1-11.
Philips TV Set, model No. 25 PT 910A, User Manual; 40 pages (undated).
Prevue Networks, Inc. Promotional Materials, 1994.
Prevue Networks, Inc. Promotional Materials (undated).
Prevue Guide Brochure, Spring 1984.
Prevue Guide Brochure, Spring 1994.
Prevue Networks and OpenTV(R) Agree to Work Together on Deploying Interactive Program Guides Worldwide, from the internet at http://www.opentv.com/news/prevuefinal.htm, printed on Jun. 28, 1999.
Probe XL Brochure, Auto Tote Systems Inc., (Newark, Delaware) (undated) 57 pgs.
Prodigy Launches Interactive TV Listing, Apr. 22, 1994 public Broadcasting Report.
"Prodigy Launches Interactive TV Listing", Apr. 22, 1994 public Broadcasting Report.
Rayers, D.J., "*Telesoftware by Teletext*," 1984 IEEE Conference Papers, vol. 240, p. 323.
RCA Satellite Receiver User's Manual, 2001.
Rewind, reply and unwind with new high-tech TV devices, by Lawrence J. Magid, LA Times. This document was printed from the internet on Jun. 6, 1999 and bears a date of May 19, 1999.
Rogers, "Telcos vs. Cable TV: The Global View With Markets Converging and Regulatory Barriers Falling, Service Carriers Are Ready to Rumble," Data Communications, Sep. 21, 1995, vol. 24, No. 13, pp. 75-76, 78, 80, XP000526196.
Roizen, Joseph "Teletext in the USA," *Society of Motion Picture and Television Engineers Journal*, Jul. 1981, pp. 602-610.
*Roseville City Council Presentation*, Mar. 13, 1985 (Defendant's Exhibit 226).
Ross Peddicord, "New on TV: You Bet Your Horse," The Sun, Baltimore Maryland Dec. 15, 1994, 1 pg.
Sato, T. et al., WWW jou no eizou browsing kikou no teian to Jitsugen [A Proposal for a Video Browsing Mechanism on World Wide Web and its Implementation], Japan Society for Software Science and Technology, collection of 14th convention articles, Japan, Japan Society for Software Science and Technology, Sep. 30, 1997, p. 193-196.
Schlender, B.R., "Couch Potatoes! Now It's Smart TV," *Fortune*, Nov. 20, 1989, pp. 111-116.
Schmuckler, Eric "A marriage that's made in cyberspace (television networks pursue links with online information services)," May 16, 1994 Mediaweek, v. 4, No. 20, p. 22(3).
Sealfon, Peggy, "High Tech TV," Photographic, Dec. 1984.
Soin et al., "Analogue-Digital ASICs", Peter Peregrinus Limited, 1991, p. 239.
Split Personality, Popular Science, Jul. 1993, p. 52.
"StarSight Interactive Television Program Guide III" Jim Leftwich and Steve Schein, Functional/ Interactional Architecture Specification Document, Orbit Interaction, Palo Alto, California, Published before Apr. 19, 1995.
StarSight Operating Guide and Quick Reference, 19 sheets (undated).
StarSight CB1500 Customer Letter, 1994, Instruction Manual, "Using StarSight 2,".
STORit, Report on the IBC'99 Demonstration, Deliverable #8 AC312/phi/prl/ds/p/008b1 Oct. 1999.
Sunada, K. et al., "Teletext Color Televisiono Receiver Model C-29M950, C26M940," NEC Home Electronics, NEC Giho, 1987.
Supplementary European Search Report for Application No. EP 98 93 5889, completed on Sep. 28, 2001.
Sussman, A. "*GTE Tunes in to Home TV Shopping*," PC Week, Jun. 28, 1988, p. C15.
SuperGuide on Screen Satellite Program Guide, User's Guide, Owner's Manual, and sales literature, 74 sheets (undated).
Super-TVs, Popular Science, Jul. 1985, p. 64.
Sussman, "GTE Tunes in to Home TV Shopping," PC Week, Jun. 28, 1988, p. C15.
Symposium Record Cable Sessions, "Digital On-Screen Display of a New Technology for the Consumer Interface," Publication Date May 1993.
Tech Notes: Product Updates from M/A-COM Cable Home Group, "*Videocipher Owner's Manual Update*," Issue No. 6, Feb. 1986.
Technical White Paper, "Open TV™ Operating Environment," (© 1998 OpenTV Inc.), pp. 1-12.

(56) References Cited

OTHER PUBLICATIONS

Technological Examination & Basic Investigative Research Report on Image Databases, Japan Mechanical Engineering Organization Int'l Society for the Advancement of Image Software, Japan, Mar. 1988.
Technology: Turn on, tune in and print out—An experimental interactive television service is set to alter our viewing habits, Financial Times (London), Oct. 14, 1993, p. 11.
Technology Overview for TV Guide on Screen Information Sheets, 8 Sheets (undated).
The New Media and Broadcast Policy: An Investigation & Research Conference Report on Broadcasting Diversification, Radio Regulatory Bureau, Japan Ministry of Posts & Telecommunications, Mar. 1982.
*Transcript of the Deposition of John Roop*, Oct. 1996, pp. 186-187.
Transcript of the testimony of Brian Klosterman, May 1997, pp. 1700-1981.
Transcript of the testimony of Michael Faber and Larry Wangberg, May 1996, pp. 554-743.
Trial testimony of Michael Axford, *Prevue Interactive, Inc. and United Video Satellite Group, Inc. v. Starsight Telecast, Inc.*, May 9, 1998, pp. 186-187, 295-315, and 352-357.
"TV Guide Online Set for Fall", Entertainment Marketing Letter, Aug. 1994.
TV Guide on Screen information sheets.
TV Listings Functional Spec., Time Video Information Services, Inc., undated.
"Using StarSight 2," Instruction Manual, StarSight Telecast, Inc., Starsight CB 1500 Customer Letter, 1994.
U.S. Appl. No. 10/453,388, Office Action dated Sep. 8, 2006.
Uniden, UST-4800 Super Integrated Receiver/Descrambler, Preliminary Reference Manual, 80 pages, Nov. 12, 1991.
Uniden, UST-4800, Integrated Receiver/Descrambler, Installation Guide, 60 pages, © 1990, Uniden America Corporation.
Uniden, UST-4800, Integrated Receiver/Descrambler, Operating Guide, 24 pages, © 1990, Uniden America Corporation.
Video Plus, Billboard, vol. 98, No. 4, Jan. 25, 1986, p. 25.
VideoGuide User's Manual, 14 sheets (undated).
VideoGuide, "VideoGuide User's Manual," pp. 1-27 (p. 11 is the most relevant) (undated).
Vision/1 from Tecmar, IBM transforms PS/1 into a TV, Info World, vol. 14(9), Mar. 2, 1992, p. 34.
Various publications of Insight Telecast, 1992 and 1993.
Veith, R.H., "Television's Teletext," Elsevier Science Publishing Co., Inc, 1983, pp. 13-20, 41-51.
Videocipher Stipulation, May 1996.
VideoGuide, "*VideoGuide User's Manual*," pp. 1-27 (p. 11 is the most relevant).
W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.
Windows 98 Feature Combines TV, Terminal and the Internet, New York Times, Aug. 18, 1998.
Winkler, M., "Computer Cinema: Computer and video: from TV converter to TV studio," Computerkino, (translation) Exhibit NK 13 of TechniSat's nullity action against EP'111, Issue 10, pp. 100-107 (1992).
Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.
Yee Hsiang Chang et al., "An Open-Systems Approach to Video on Demand," IEEE Communications Magazine, May 1994, pp. 68-80.
Transcript of the Deposition of John Roop, Jun. 2001, p. 608.
Videocassette of Mini Theatre, (Plaintiff's Exhibit 327).
Case 4:11-cv-06591-PJH, Complaint for Declaratory Relief (plaintiff), dated Dec. 21, 2011, 16 pages.
Hitachi Consumer Electronics Co., Ltd., Certification of market introduction in 1993 of Hitachi Projection TV Model 55EX7K.
Hitachi Projection Color TV Operating Guide, for Models 55EX7K, 50EX6K, 50ES1B/K, and 46EX3B/4K, undated.
Hitachi Service Manual, No. 0021, Projection Color Television, Models 55EX7K, 50EX6K, 50ES1B/K, 46EX3B/4K, and 46EX3BS/4KS, Aug. 1993.
Revolution on the Screen, 2nd Ed. Verlag, Wilhelm Goldmann. 1979 (English Translation).
Wikipedia-Teletext Excerpt (English Translation).
JVC Service Manual, 27" Color Monitor/Receiver, Model AV-2771S (U.S.), Jul. 1991.

* cited by examiner

| DEMOGRAPHIC CATEGORIES | VALUE | PRESELECTED VALUE ADVERTISEMENT 1 | PRESELECTED VALUE ADVERTISEMENT 2 |
|---|---|---|---|
| ① SPORTS FAN | 1 | 0.5 | 0.7 |
| ② SCIENCE FICTION FAN | 0.7 | | |
| ③ PARENT | 0 | | |
| ④ DOG-LOVER | 0.5 | | |
| ⑤ CAT-LOVER | 0.7 | | |
| ⑥ ANNUAL INCOME OVER $20,000 | 1 | 1 | |
| ⑦ ANNUAL INCOME OVER $30,000 | 0 | | |
| ⑧ ANNUAL INCOME OVER $50,000 | 0 | | |
| ⑨ FEMALE AGE 20-30 | 0 | | |
| ⑩ MALE AGE 18-40 | 1 | | 1 |

FIG. 2

| USER INPUT | WEIGHT VALUE |
| --- | --- |
| ① RECORD PROGRAM | 1.0 |
| ② SET REMINDER | 0.5 |
| ③ TUNE/WATCH MINIMUM 5 MINUTES | 0.5 |
| ④ RETRIEVE INFORMATION | 0.25 |

FIG. 3

| CHANNEL | DEMOGRAPHIC CATEGORIES | | | | ... |
|---|---|---|---|---|---|
| | SPORTS FAN | | SCIENCE FICTION FAN | | |
| | PRESELECTED VALUE(PV) | WEIGHT FACTOR(WF) | PRESELECTED VALUE(PV) | WEIGHT FACTOR(WF) | |
| ESPN | 0.95 | 2 | 0.6 | 1.5 | |
| CHANNEL XYZ | 0.5 | 1 | 0.8 | 1.8 | |
| ⋮ | | | | | |

FIG. 4

INTERACTIVE TELEVISION PROGRAM GUIDE SYSTEM FOR DETERMINING USER VALUES FOR DEMOGRAPHIC CATEGORIES

This application is a continuation of U.S. patent application Ser. No. 12/905,467, filed Oct. 15, 2010, currently pending, which is a continuation of U.S. patent application Ser. No. 12/579,639, filed Oct. 15, 2009, now abandoned, which is a continuation of U.S. patent application Ser. No. 10/923,263, filed Aug. 20, 2004, now U.S. Pat. No. 7,634,786, issued Dec. 15, 2009, which is a continuation of U.S. patent application Ser. No. 09/139,777, filed Aug. 25, 1998, now abandoned, which claims the benefit of U.S. provisional application No. 60/085,750, filed May 15, 1998, all of which are hereby incorporated by reference herein in their entireties.

BACKGROUND OF THE INVENTION

This invention relates to interactive television program guides, and more particularly, to an interactive television program guide system for determining user values for demographic categories such that the determined values can be utilized for specified uses, such as for targeting advertisements.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to view television program listings in different display formats. For example, a user may instruct the program guide to display a grid of program listings organized in a channel-ordered or a time ordered list. Users may also search and sort program listings by theme (e.g., movies, sports, etc.) or by title (i.e, alphabetically). A user may obtain additional information for a program by placing a highlight region on a desired program listing and pressing an "info" button. The user may purchase a pay program from the program guide by placing the highlight region on a program listing and pressing an "OK" button. Some systems allow the user to select a program for recording by placing the highlight region on a program listing and pressing a "record" button.

The user's interactions with the program guide are indicative of the user's interests. For example, if the user purchases a pay-per-view movie, making that purchase shows that the user is interested in movies of that type. Searching for program listings in the category "sports" indicates that the user is interested in sports. Although the user's interactions with the program guide indicate the user's interests, previously known program guide systems did not monitor or use this information.

In commonly-assigned co-pending U.S. patent application Ser. No. 09/034,939, filed Mar. 4, 1998, which is incorporated herein by reference in its entirety, there is described a program guide system for determining a user's interests by monitoring the user's interactions with the program guide. The '939 application also describes utilizing the user's interests to present advertisements or to take actions in the program guide.

It would be desirable to be able to provide a systematic approach for categorizing user information into demographic categories that could then be used for specified purposes, such as for targeting advertisements or taking certain actions in the program guide. As used throughout in the present application, "demographic categories" means categories of user information, such as income, age, hobbies, etc., which serve as a basis for identification and selection. Advantages that would be offered by such a systematic approach include greater effectiveness and less cost in achieving a specified purpose. For example, to target advertisements, the use of demographic categories means more effective targeting of advertisements and consequently lower costs. Advertisers could select demographic categories to ensure that the advertisements target only those users who would most likely be interested in the products or services they offer.

It is therefore an object of the present invention to provide a program guide system which categorizes information obtained from a user's interaction with the program guide into demographic categories. Another object of the invention is to determine user values for the demographic categories. Still another object of the invention is to provide an interactive television program guide system which determines user values for the demographic categories such that advertisers can select specific demographic categories of significance to ensure that the products or services they offer will be targeted to those users who will most likely be interested in purchasing the products or services.

SUMMARY OF THE INVENTION

This and other objects of the invention are accomplished in accordance with the principles of the present invention by an interactive television program guide system for determining user input values for demographic categories. The system includes user television equipment having a receiver for receiving program guide information for the interactive television program guide, a user input receiver for receiving user input from user interface, such as a remote control, a microprocessor which utilizes the user input received to determine user values for demographic categories, and memory for storing the user values determined.

In one illustrative use of the system for targeting advertisements to a user of the interactive television program guide, the receiver also receives advertisements, where the advertisements have preselected values for specified demographic categories. The user television equipment, preferably using microprocessor, compares the preselected values for the specified demographic categories associated with the advertisements with values of corresponding demographic categories stored in memory to determine which advertisements should be displayed. Those advertisements determined to be displayable based upon the comparison are then displayed.

Further features of the invention, its nature and various advantages will be more apparent from the accompanying drawings and the following detailed description of the preferred embodiments.

BRIEF DESCRIPTION OF THE DRAWINGS

FIG. 2 is a list of ten exemplary demographic categories and their values, as well as preselected values for two advertisements received by the user television equipment of FIG. 1 in accordance with the present invention.

FIG. 3 is a table showing four exemplary user inputs and their predetermined weight values to be utilized by the user television equipment of FIG. 1 to determine values for demographic categories in accordance with the present invention.

FIG. 4 is a table showing exemplary demographic categories and preselected value and weight factor for each of the channels to be utilized by the user television equipment of FIG. 1 to determine values for demographic categories in accordance with the present invention.

DETAILED DESCRIPTION OF THE PREFERRED EMBODIMENTS

Figure 1:
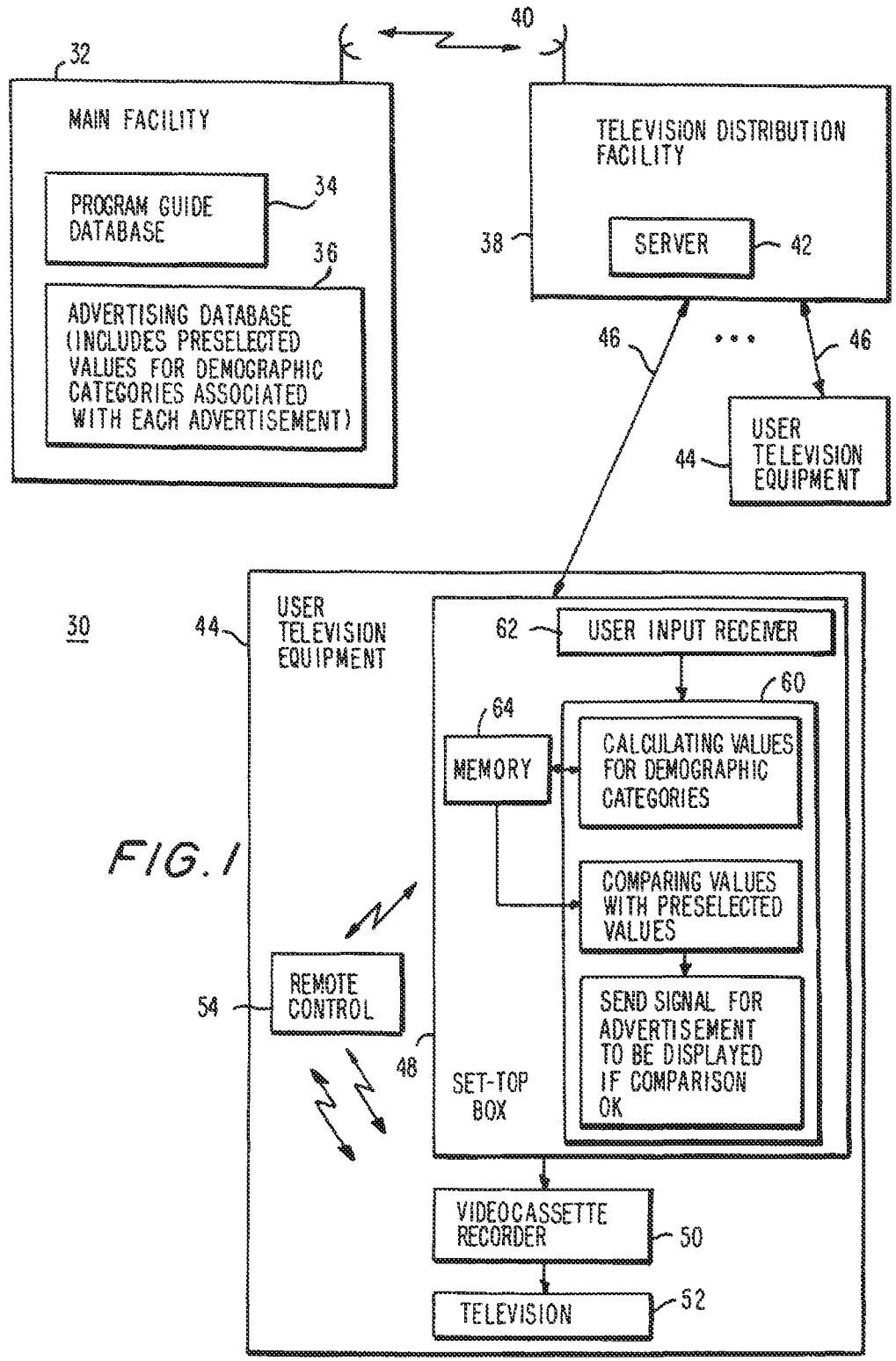
FIG. 1 is a diagram of an illustrative system for targeting advertisements to a user of an interactive television program guide in accordance with the present invention.

An illustrative program guide system 30 for use in targeting advertisements to specified users in accordance with the present invention is shown in FIG. 1. Although the specified purpose for which user demographic information is to be utilized is illustratively shown to be for targeting advertisements, it will be apparent to one skilled in the art that user demographic information may also be used for other specified purposes.

A main facility 32 includes a program guide database 34 for storing program guide information, such as television program guide listings data, pay-per-view ordering information, television program promotional information, etc. The main facility 32 also includes an advertising database 36 for storing, advertising information. Information from databases 34 and 36 may be transmitted to a television distribution facility 38 via communications link 40. There are typically numerous television distribution facilities 38 to which information from main facility 32 is transmitted in parallel, although only one such television distribution facility 38 is shown in FIG. 1 to avoid over-complicating the drawings. Link 40 may be a satellite link, a telephone network link, a cable or fiber optic link, a microwave link, a combination of such links, or any other suitable communications path. If it is desired to transmit video signals (e.g., for advertising and promotional videos) over link 40 in addition to data signals, a relatively high bandwidth link such as a satellite link is generally preferable to a relatively low bandwidth link such as a telephone line.

The television distribution facility 38 is a facility for distributing television signals to users, such as a cable system headend, a broadcast distribution facility, or a satellite television distribution facility.

The program guide information transmitted by the main facility 32 to the television distribution facility 38 includes television program listings data, such as program times, channels, titles, descriptions, etc. Transmitted program information also includes pay program data, such as pricing information for individual programs and subscription channels, time windows for ordering programs and channels, telephone numbers for placing orders that cannot be impulse ordered, etc. The advertising information transmitted by the main facility 32 to the television distribution facility 38 includes text, graphics, video and/or other (e.g. audio) advertisements for various products and services. As will be described in greater detail later, the advertising information may also include preselected values for demographic categories associated with each advertisement.

If desired, some of the program guide and advertising information may be provided using data sources at facilities other than then main facility 32. For example, data related to pay program order processing (e.g., billing data and the like) may be generated by an order processing and billing system that is separate from the main facility 32 and separate from the television distribution facility 38. Similarly, advertising information may be generated by an advertising facility that is separate from the main facility 32 and the television distribution facility 38.

Regardless of its source, advertising information may be maintained on a server 42 within the television distribution facility 38, if desired. Server 42 may be capable of handling text, graphics, and video.

Television distribution facility 38 distributes program guide and advertising information to user television equipment 44 via communications paths 46. User television equipment may include a set-top box or may be an advanced television receiver or personal computer television (PC/TV), if desired. Each communications path 46 may be a satellite link, a telephone network link, a cable or fiber optic link, a microwave link, a combination of such links, or any other suitable communications path. Program guide data may be distributed over an out-of-band channel on path 46, an in-band digital channel, or any other suitable technique. Advertising information may be distributed using any of a number of suitable techniques. For example, text and graphics advertisements may be distributed over an out-of-band channel using an out-of-band modulator. Video advertisements may also be distributed in this manner, although large quantities of video information may be more efficiently distributed using one or more digital channels on path 46. Such digital channels may also be used for distributing text and graphics.

Each user has a receiver unit, which is typically a set-top box 48, but which may be other suitable television equipment into which set-top box functionality as will be described herein has been integrated. Program guide data is distributed to the set-top boxes 48 periodically. The television distribution facility 38 may also poll the set-top boxes 48 periodically for certain information (e.g., pay program account information or information regarding programs that have been purchased and viewed using locally-generated authorization techniques).

Each set-top box 48 is typically connected to an optional videocassette recorder 50 so that selected television programs may be recorded. The videocassette recorder 50 is connected to a television 52. To record a program, the set-top box 48 tunes to a particular channel and sends control signals to the videocassette recorder 50 using an infrared transmitter) that directs the videocassette recorder 50 to start and stop recording at appropriate times.

An interactive television program guide is implemented on user television equipment 44 (e.g., on set-top box 48). During use of the interactive television program guide implemented on the set-top box 48, television program listings may be displayed on the television 52. Each set-top box 48, videocassette recorder 50, and television 52 may be controlled by one or more remote controls 54 or any other suitable user input interface, such as a wireless keyboard, mouse, trackball, dedicated set of buttons, etc.

The set-top box 48 includes a microprocessor 60, a user input receiver 62, and memory 64. Other components of the set-top box which are needed for implementing a program guide are not specifically described herein since they are not part of the present invention. The user input receiver 62 receives user input from remote control 54 or other user input interfaces. For example, if user input is to be transmitted by an infrared remote control signal, then the user input receiver would be an infrared signal receiver. As will be described in greater detail later, the microprocessor 60 utilizes the user input signals received by the user input receiver 62 to calculate values for different demographic categories.

The microprocessor 60 also compares the values of the relevant demographic categories for the user stored in memory 64 with the preselected values associated with each advertisement received by the set-top box 48 to determine whether the advertisement is to be displayed on the television 52. Memory 64, which is preferably non-volatile memory, stores values of the demographic categories for the user. Memory 64 may also store information necessary to calculate the values of the demographic categories for the user. For example, memory 64 may store information such as the likelihood that a viewer watching the ESPN channel is a fan of sports. Such information may also be stored in another memory electrically coupled to the microprocessor 60.

FIG. 2 is a sample list of the demographic categories and the values of the demographic categories for the user stored in memory 64. FIG. 2 also shows the preselected values for two advertisements received by the set-top box 48. Under the demographic categories heading, there are shown ten exemplary, predefined demographic categories. These categories are: (1) sports fan, (2) science fiction fan, (3) parent, (4) dog-lover, (5) cat-lover, (6) annual income over $20,000, (7) annual income over $30,000, (8) annual income over $50,000, (9) female age range of 20-35, and (10) male age range of 18-40.

The value for each of the demographic categories is from 0 to 1. Zero indicates that the user does not fit the demographic category (or the probability that the user fits the category is zero). One indicates that the user fully fits the demographic category (or the probability that the user fits the category is one). Any value between 0 and 1 indicates that the user partially fits the demographic category, with a higher number indicating a correspondingly better fit. The selection of this range is not significant and any other range (e.g., 1-10) or representation of the demographic information (e.g., codes, tags, characters or the like) may be used to carry out the objects of the present invention. The determination of the values for the demographic categories will be described later.

For the exemplary user of FIG. 2, the values for the demographic categories indicates that the user is a male in the age group of 18-40, his annual income is over $20,000 but not over $30,000, he is an unmitigated sports fan, and he is a greater cat-lover (0.7 value) than a dog-lover (0.5 value).

Advertisement #1, which for purposes of illustration only will be assumed to be for a sports utility vehicle, has preselected values of at least 0.5 for the sports fan demographic category and 1 for the annual income over $30,000 demographic category. Note that FIG. 2 is not necessarily indicative of what a real advertiser of sports utility vehicles would select in terms of values or even demographic categories, but is suitable for purposes of illustration. The 0.5 preselected value for the sports fan category means that the advertiser desires to target advertisement #1 to someone who is at least moderately interested in sports. In addition, the advertiser desires to target someone who is at least making $30,000 a year. Since the user in the example of FIG. 2 does not fit the income category, advertisement #1 would not be displayed on the user's television 52.

Advertisement #2, which for purposes of illustration only will be assumed to be for beer, has preselected values of at least 0.7 for the sports fan demographic category, and 1 for the male in the age group of 18-40 demographic category. The 0.7 preselected value for the sports fan category means that the advertiser desires to target advertisement #2 to someone who has at least fairly significant interest in sports. In addition, the advertiser desires to target someone who is a male in the age group of 18-40. Since the user in FIG. 2 fits both categories as demonstrated by the values, advertisement #2 would be displayed on the user's television 52.

The value for each demographic category is reflective of the characteristics of the user. There are many different ways to calculate or determine values for such demographic categories. Any suitable technique for generating information representing the demographic characteristics of the user may be used if desired. For example, demographic information on users may be gathered using surveys (on-line, telephone, door-to-door, mail, program-guide-based, etc.) or other type of market research. The following describes one suitable technique for calculating or determining the values for the demographic categories based on user inputs in the program guide.

User inputs received by the user input receiver 62 have predetermined weight values (WV) associated with them. In FIG. 3, there are shown four such exemplary user inputs with corresponding weight values (the selection of value range 0-1 for the weight values is not significant in and of itself): recording a program with weight value of 1.0; setting a reminder with weight value of 0.5; tuning to a program and watching for at least five minutes with weight value of 0.5; and retrieving information about a program with weight value of 0.25. The weight values are indicative of the effect the corresponding user inputs have on the values of the demographic categories. The greater the weight value of a user input, the greater the values of the demographic categories associated with such user input. Therefore, according to the example of FIG. 3, a user who records a program will have greater values for the pertinent demographic categories than she will retrieving information about the same program. This is because the act of recording a program generally indicates a greater level of interest in the program then just retrieving information for the program.

Each channel and program having a bearing on at least one of the demographic categories may have a preselected value (PV) for each demographic category associated with it. This preselected value is indicative of the channel or program's indication of how well a user fits the demographic category. For example as shown in FIG. 4, the ESPN channel may have a preselected value of 0.95 (from value range of 0-1) associated with the sports fan demographic category since there is a very strong likelihood that a viewer of ESPN is a sports fan. However, the ESPN channel may have a preselected value of 0.5 associated with the cat-lover demographic category since there likely is not a strong connection between the two. The preselected values may be determined from research, survey, poll, or any other reliable means. Again, it should be noted that the selection of value range 0-1 for the preselected values is not significant in and of itself.

There is preferably a default value assigned for each demographic category. For example, the sports fan demographic category may have a default value of 0.5. The default value may represent the value for a "typical" user and is utilized in calculating the value of the demographic category for the user as will be discussed below.

Each demographic category may have a period (P), which is the minimum number of user inputs necessary before the demographic category value is deemed to be meaningful and reflective of the user. For example, the sports fan demographic category may have a period of five.

Each channel or program having a preselected value for an associated demographic category may have a predetermined weight factor (WF). For example, the ESPN channel may have a weight factor of 2 for the sports fan demographic category as shown in FIG. 4. The weight factor represents the significance of the channel or program relative to the period for the demographic category.

For each user input involving a relevant channel or program, the value for a demographic category is as follows:

$$V_d(i) = \frac{(WV*WF*PV) + ((P-(WV*WF))*V_d(i-1))}{P}$$

$V_d(i-1)$ is the previous value for the demographic category and i represents the number of user inputs. Where i=1 (i.e., the first user input involving a relevant channel or program associated with the demographic category), the $V_d(i-1)$ used above is the default value for the demographic category. It should be noted that any other equation or function which properly reflects the user's interests based on user inputs into the system can be used to determine values for demographic categories in accordance with the present invention.

As an example, the determination of value for the sports fan demographic category given three user inputs is described. Let's assume that the three user inputs are as follows: (1) retrieve information about a sporting event on ESPN; (2) tune in and watch ESPN for at least five minutes; and (3) record a sporting event from ESPN. Using the values set forth in the examples provided above and in FIG. 3, $$V_{sports\ fan}(1) = \frac{(0.25*2*0.95) + ((5-0.25*2)*0.5)}{5}$$
$$= (0.475 + 2.25)/5 = 0.545$$

$$V_{sports\ fan}(2) = \frac{(0.5*2*0.95) + ((5-0.5*2)*0.545)}{5}$$
$$= (0.95 + 2.18)/5 = 0.626$$

$$V_{sports\ fan}(3) = \frac{(1*2*0.95) + ((5-1*2)*0.626)}{5}$$
$$= (1.9 + 1.878)/5 = 0.7556$$

After the three user inputs involving ESPN, the value of the sports fan demographic category is 0.7556, indicating that the user is very much a sports fan. However, because there have only been three user inputs received and the predefined period for the sports fan demographic category is five, the calculated value may not be significant enough for purposes of targeting advertisements (note that the calculated value may still be used if desired). If the calculated value is not to be used for this reason, then the default value may be used instead.

It is preferable to target advertisements to users based on current user information. Therefore, the present invention provides a decay function to "refresh" the values of the demographic categories for the user on a periodic basis, such as every seven days, or based on a specified number of user inputs.

As an example, let's assume that the value for the sports fan demographic category stored in memory 64 is 0.8 and the decay function refreshes the value for the sports fan demographic category every seven days during which no input action has been received. If it has been seven days since the last user input affecting the sports fan demographic category has been received, the decay function will refresh the value for the sports fan category to a predetermined value, such as the default value for the demographic category. The decay function may also use the formula given above for $V_d(i)$, with different values/parameters. Note that it is preferable to have the microprocessor 60 perform the decay function.

In FIG. 2, there is illustrated what may be called the threshold approach of targeting advertisements to users. That is, if the preselected value(s) of a demographic category for an advertisement is met by the value of the demographic category for the user, then the advertisement is displayed to the user by the program guide.

Another approach of targeting advertisements to users may be called the best fit or closest approach. In this approach, the "closeness" of the preselected values of the demographic categories for an advertisement is determined from the values of the demographic categories for the user. This closeness may be determined by, for example, calculating the absolute difference between the preselected value and the user value for each demographic category, and then adding all of the absolute differences. Root-mean-square may also be used. The best fit approach is particularly useful where it is desired to select the advertisement(s) to be displayed from among many advertisements transmitted to the user's set-top box.

It should be noted that the values of the demographic categories may be based on user information from an external source. For example, if the user's annual income is determined from publicly available information or from a form filled out by the user, then this information can be transmitted to the set-top box and stored in memory.

In the illustrative program guide system 30 of FIG. 1, the set-top box 48 calculates values for the demographic categories, stores the calculated values and other information necessary to calculate the values, and compares the values of the relevant demographic categories for the user with the preselected values associated with each advertisement to determine whether the advertisement is to be displayed. The program guide system of the present invention can be modified in a manner apparent to those skilled in the art reading the description herein such that any of these operations performed of the set-top box can be performed instead at the television distribution facility 38 or the main facility 32 or at any other location (not shown in FIG. 1).

Figure 5:
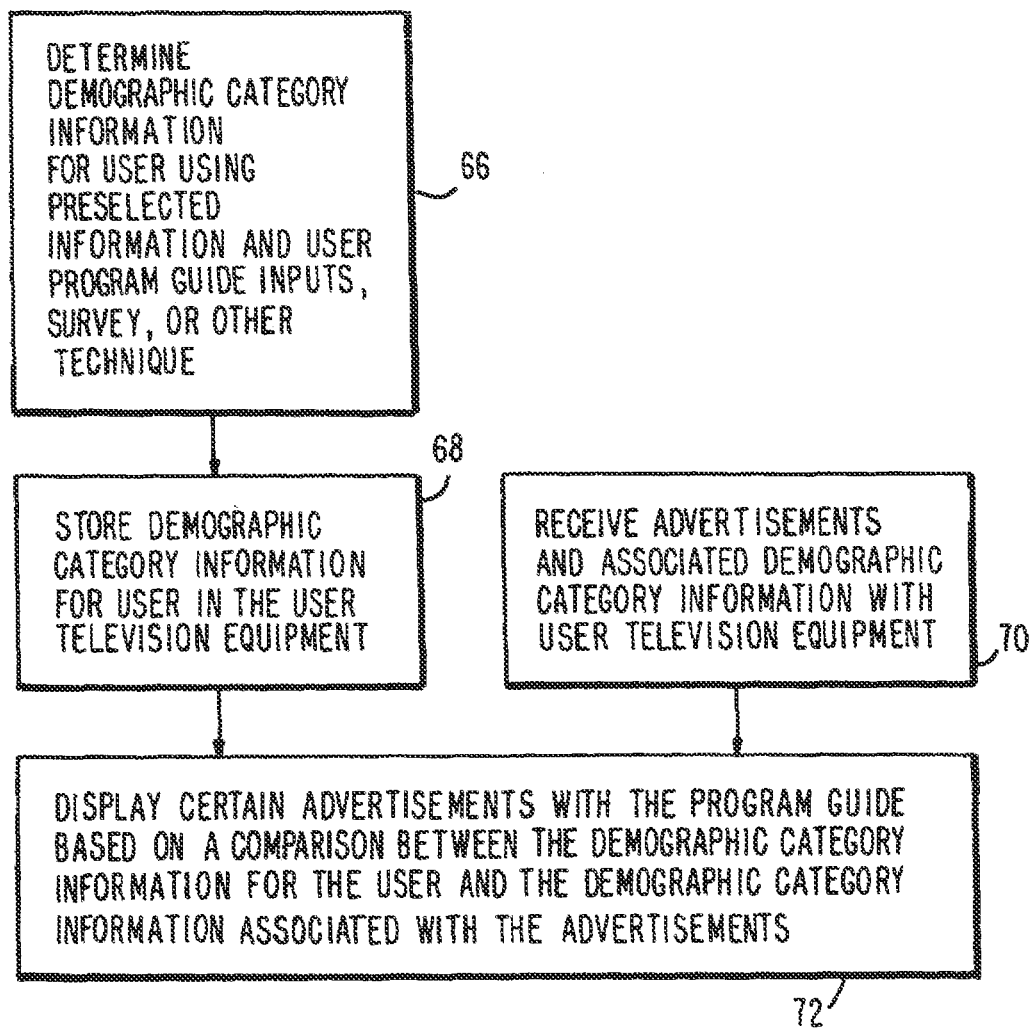
FIG. 5 is a flowchart showing steps involved in displaying advertisements based on demographic information in accordance with the present invention.

Steps involved in displaying advertisements based on demographic information are shown in FIG. 5. At step 66, demographic category information for the user is determined using a suitable technique such as a survey, or by monitoring the user's actions with the program guide and calculating the demographic category information based upon the user's actions and preselected information stored in memory. At step 68, the demographic category information that is representative of the user's demographic profile is stored in the user's television equipment 44. At step 70, advertisements with associated demographic category information (representative of the audiences to which the advertisers desire to target the advertisements) are distributed to the user television equipment (e.g., by transmission from main facility 32 and distribution via television distribution facility 38). At step 72, the program guide determines which advertisements are to be displayed for the user by comparing the demographic category information associated with the advertisements with the user's demographic category information.

The foregoing is merely illustrative of the principles of this invention and various modifications can be made by those skilled in the art without departing from the scope and spirit of the invention.

What is claimed is:

1. A method for targeting advertisements to a user of an interactive system, the method comprising:
   receiving a user input associated with a video program at a first time period, wherein the video program is associated with a demographic characteristic;
   determining whether the received user input is a first or a second type of function of a plurality of different types of functions of the interactive system, wherein:
      each of the plurality of different types of functions performs a different type of function of the interactive system with respect to the video program and each of the plurality of different types of functions is associated with a weight value quantifying the user's affiliation with the demographic characteristic associated with the video program,
      a first weight value of the first type of function is larger than a second weight value of the second type of function indicating that the first type of function indicates a stronger user affiliation with the demographic characteristic associated with the video program than the second type of function, and
      a memory stores a first association between the first weight value and the first type of function and a second association between the second weight value and the second type of function;
   in response to determining that the received user input is the first type of function, retrieving, from the memory, based on the first association, the first weight value associated with the first type of function;
   calculating, using a processor, a user demographic modification value, based on the retrieved first weight value by weighting the demographic characteristic associated with the video program by the first weight value;
   modifying a user demographic value based on the user demographic modification value;
   storing the user demographic value at the interactive system;
   comparing the user demographic value to a plurality of demographic criteria associated with a plurality of advertisements to identify an advertisement associated with a demographic value that corresponds to the user demographic value; and
   selecting the identified advertisement of the plurality of advertisements based on the comparing.

2. The method of claim 1, wherein the user demographic value is a default value.

3. The method of claim 1, wherein the user input requests activation of the first type of function of the interactive system for the video program.

4. The method of claim 1, wherein the user demographic value is modified if a required number of user inputs requesting the first type of function of the interactive system are received.

5. The method of claim 1, wherein the user demographic value is set to a default user demographic value if a required number of user inputs requesting the first type of function of the interactive system are not received.

6. The method of claim 1, wherein the user demographic value is adjusted toward a predetermined user demographic value after a predetermined amount of time wherein the user demographic value is not modified.

7. The method of claim 6, wherein the user demographic value is adjusted based on a decay function.

8. The method of claim 1, wherein the user demographic value is associated with at least one demographic category.

9. An interactive system for targeting advertisements to a user of the interactive system, the interactive system comprising:
   a user input receiver configured to receive a user input associated with a video program at a first time period, wherein the video program is associated with a demographic characteristic; and
   a processor, wherein the processor is configured to:
      determine whether the received user input is a first or a second type of function of a plurality of different types of functions of the interactive system, wherein:
         each of the plurality of different types of functions performs a different type of function of the interactive system with respect to the video program and each of the plurality of different types of functions is associated with a weight value quantifying the user's affiliation with the demographic characteristic associated with the video program,
         a first weight value of the first type of function is larger than a second weight value of the second type of function indicating that the first type of function indicates a stronger user affiliation with the demographic characteristic associated with the video program than the second type of function, and
         a memory stores a first association between the first weight value and the first type of function and a second association between the second weight value and the second type of function;
      in response to determining that the received user input is the first type of function, retrieve, from the memory, based on the first association, the first weight value association with the first type of function;
      calculate a user demographic modification value, based on the retrieved first weight value by weighting the demographic characteristic associated with the video program by the first weight value;
      modify a user demographic value based on the user demographic modification value;
      store the user demographic value at the interactive system;
      compare the user demographic value to a plurality of demographic criteria associated with a plurality of advertisements to identify an advertisement associated with a demographic value that corresponds to the user demographic value; and
      select the identified advertisement of the plurality of advertisements based on the comparing.

10. The system of claim 9, wherein the user demographic value is a default value.

11. The system of claim 9, wherein the user input requests activation of the first type of function of the interactive system for the video program.

12. The system of claim 9, wherein the user demographic value is modified if a required number of user inputs requesting the first type of function of the interactive system are received.

13. The system of claim 9, wherein the user demographic value is set to a default user demographic value if a required number of user inputs requesting the first type of function of the interactive system are not received.

14. The system of claim 9, wherein the user demographic value is adjusted toward a predetermined user demographic value after a predetermined amount of time wherein the user demographic value is not modified.

15. The system of claim 14, wherein the user demographic value is adjusted based on a decay function.

16. The system of claim 9, wherein the user demographic value is associated with at least one demographic category.

\* \* \* \* \*